US012749813B2

(12) United States Patent
Mizuno et al.

(10) Patent No.: US 12,749,813 B2
(45) Date of Patent: Sep. 29, 2026

(54) ANTENNA, INFORMATION PROCESSING APPARATUS, AND COMPOSITE ANTENNA APPARATUS

(71) Applicant: YOKOWO CO., LTD., Tokyo (JP)

(72) Inventors: Hirotoshi Mizuno, Gunma (JP); Masaya Imadate, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 599 days.

(21) Appl. No.: 18/027,369

(22) PCT Filed: Sep. 16, 2021

(86) PCT No.: PCT/JP2021/034200

§ 371 (c)(1),
(2) Date: Mar. 21, 2023

(87) PCT Pub. No.: WO2022/070968

PCT Pub. Date: Apr. 7, 2022

(65) Prior Publication Data

US 2023/0378653 A1 Nov. 23, 2023

(30) Foreign Application Priority Data

Sep. 29, 2020 (JP) ................................ 2020-163014

(51) Int. Cl.
*H01Q 1/42* (2006.01)
*G01S 19/01* (2010.01)
(Continued)

(52) U.S. Cl.
CPC ............. *H01Q 9/045* (2013.01); *G01S 19/01* (2013.01); *H01Q 1/42* (2013.01); *H01Q 3/34* (2013.01); *H01Q 13/10* (2013.01); *H01Q 23/00* (2013.01)

(58) Field of Classification Search
CPC .......... H01Q 1/42; H01Q 1/3275; H01Q 3/34; H01Q 5/35; H01Q 5/385; H01Q 9/045;
(Continued)

(56) References Cited

U.S. PATENT DOCUMENTS 5,880,694 A 3/1999 Wang et al.
6,252,553 B1 * 6/2001 Solomon .............. H01Q 9/0442 343/700 MS
(Continued)

FOREIGN PATENT DOCUMENTS

CN 202678520 U 1/2013
CN 106450714 A 2/2017
(Continued)

OTHER PUBLICATIONS

Office Action issued on Jun. 26, 2024, in corresponding Chinese patent Application No. 202111137455.4, 18 pages.
(Continued)

*Primary Examiner* — Tung X Le
(74) *Attorney, Agent, or Firm* — XSENSUS LLP

(57) ABSTRACT

An antenna includes a dielectric, and a patch electrode and a circuit substrate which are mounted on the dielectric, wherein the patch electrode has four feeding terminals, and wherein substrate-side feeding terminals which are electrically continuous respectively with the four feeding terminals in a one-to-one manner, a phase circuit which performs a phase shift for signals output from the substrate-side feeding terminals, a mixing circuit which mixes signals for which the phase shift is performed by the phase circuit, and an amplifier circuit which amplifies signals mixed by the mixing circuit are mounted on the circuit substrate.

16 Claims, 21 Drawing Sheets

(51) Int. Cl.

| | |
|---|---|
| ***H01Q 3/34*** | (2006.01) |
| ***H01Q 9/04*** | (2006.01) |
| ***H01Q 13/10*** | (2006.01) |
| ***H01Q 23/00*** | (2006.01) |

(58) Field of Classification Search

CPC ...... H01Q 9/0435; H01Q 13/10; H01Q 19/01; H01Q 23/00

See application file for complete search history.

(56) References Cited

U.S. PATENT DOCUMENTS

| | | | | |
|---|---|---|---|---|
| 7,084,815 | B2 * | 8/2006 | Phillips | H01Q 5/40 343/846 |
| 7,209,080 | B2 * | 4/2007 | Crouch | H01Q 9/0435 343/770 |
| 7,277,056 | B1 * | 10/2007 | Thiam | H01Q 5/40 455/132 |
| 11,233,329 | B2 | 1/2022 | Sampo | |
| 11,894,624 | B2 | 2/2024 | Sampo | |
| 2005/0116863 | A1 | 6/2005 | Yuanzhu | |
| 2008/0129636 | A1 | 6/2008 | Surittikul et al. | |
| 2018/0301798 | A1 * | 10/2018 | Ikeda | H01Q 13/10 |
| 2020/0136257 | A1 * | 4/2020 | Hwang | H01Q 1/3275 |
| 2021/0135366 | A1 | 5/2021 | Sampo | |
| 2023/0378653 | A1 | 11/2023 | Mizuno et al. | |

FOREIGN PATENT DOCUMENTS

| | | | |
|---|---|---|---|
| CN | 110383581 | A | 10/2019 |
| CN | 110943294 | A | 3/2020 |
| CN | 110994199 | A | 4/2020 |
| CN | 216288950 | U | 4/2022 |
| EP | 3595086 | A1 | 1/2020 |
| EP | 3671951 | A1 | 6/2020 |
| JP | 2000-68735 | A | 3/2000 |
| JP | 2001-44753 | A | 2/2001 |
| KR | 10-2011-0089901 | A1 | 8/2011 |
| WO | 2018/164018 | A1 | 9/2018 |
| WO | 2020/075744 | A1 | 4/2020 |

OTHER PUBLICATIONS

International Search Report and Written Opinion mailed on Nov. 30, 2021, received for PCT Application PCT/JP2021/034200, filed on Sep. 16, 2021, 11 pages including English Translation.

Notice of Reasons for Refusal mailed on Jan. 26, 2021, received for JP Application 2020-163014, 8 pages Including English Translation.

Extended European search report issued on Oct. 2, 2024, in corresponding European patent Application No. 21875270.7, 9 pages.

Farshid Tamjid et al., "Toward High-Performance Wideband GNSS Antennas-Design Tradeoffs and Development of Wideband Feed Network Structure", IEEE Transactions on Antennas and Propagation, vol. 68, No. 8, Aug. 4, 2020, pp. 5796-5806, total 11 pages.

* cited by examiner

ANTENNA, INFORMATION PROCESSING APPARATUS, AND COMPOSITE ANTENNA APPARATUS

CROSS-REFERENCE TO RELATED APPLICATIONS

This application is based on PCT filing PCT/JP2021/034200, filed Sep. 16, 2021, which claims priority to Japanese Patent Application No. 2020-163014, filed Sep. 29, 2020, the entire contents of each are incorporated herein by reference.

TECHNICAL FIELD

The present disclosure relates to an antenna, an information processing apparatus, and a composite antenna apparatus which are capable of being installed in a moving body such as a vehicle, a robot, or a drone.

BACKGROUND ART

In recent years, development of autonomous driving of a vehicle such as an ADAS (advanced driver-assistance system) has rapidly been progressing. In such autonomous driving, it is desired to acquire current position information of a vehicle as quickly and accurately as possible by using a reception signal received by an antenna, which is attached to the vehicle, for a satellite positioning system. An easy measure for enhancing acquisition accuracy of the position information is a measure in which signals at multiple frequencies from plural artificial satellites are received by antennas corresponding to the respective frequencies and the position information is thereby calculated based on the respective reception signals. However, in a case of an antenna apparatus for a vehicle, in addition to the respective antennas for receiving the signals at the multiple frequencies, an antenna portion is also implemented which is capable of being adapted to other different frequency bands such as AM and FM bands. Thus, when the respective antennas for receiving the signals at the multiple frequencies are mounted in the same housing, a device itself becomes large and thereby becomes unsuitable for a vehicle.

As for such problems, in Patent Literature 1, the applicant of the present application has suggested an antenna with slots in which two pairs of slots are formed in and two feeding points are mounted on a patch electrode formed with a square conductor. The two pairs of slots have the same shape and size and are arranged in point symmetry with respect to a center point of the square conductor. The two feeding points are mounted in positions which are eccentric slightly outward from the center of the square conductor, power is fed to the two feeding points, and reception of a circularly polarized wave is efficiently performed.

The antenna with slots which is disclosed in Patent Literature 1 is capable of an antenna action conforming to an outer peripheral dimension of the square conductor and also of a slot antenna action conforming to dimensions of the slots and, as one antenna, can receive signals at multiple frequencies which are transmitted from plural artificial satellites. Further, meandering shapes are formed in the slots, flexibility of setting of reception bands of the antenna action and the slot antenna action is thereby improved, and adaptation to a requested reception band becomes easy. Furthermore, in addition to achievement of efficient reception of a circularly polarized wave by two-point feeding, an axial ratio can be made good in a wide frequency band.

PRIOR ART DOCUMENTS

Patent Literature

Patent Literature 1: International Publication No. WO 2018/164018

SUMMARY OF INVENTION

Problems to Be Solved by the Invention

In general, a moving body such as a vehicle always three-dimensionally changes its posture in movement. Further, for example, in order to meet a request for an improvement in accuracy of position information in autonomous driving of a vehicle such as an ADAS, it is desirable that an antenna for a satellite positioning system have a high axial ratio for a signal from an artificial satellite in a wide frequency band and have a good axial ratio for a wide elevation angle. In addition, an improvement in accuracy of the position information is desired also for a drone or the like as another moving body than a vehicle. In other words, for example, as for unmanned controlled moving bodies such as vehicles by autonomous driving and small unmanned aircrafts of drones, an improvement in position accuracy is desired more than ever before.

One object of the present disclosure is to contribute to a further improvement in accuracy of a position of a moving body which is derived based on a reception signal by an antenna, for example.

Solution to the Problems

One aspect of the present disclosure provides an antenna including: a dielectric; and a patch electrode and a circuit substrate which are mounted on the dielectric, in which the patch electrode has four feeding terminals, and on the circuit substrate, substrate-side feeding terminals which are electrically connected respectively with the four feeding terminals in a one-to-one manner, a phase circuit which performs a phase shift for signals output from the substrate-side feeding terminals, a combining circuit which combines signals for which the phase shift is performed by the phase circuit, and an amplifier circuit which amplifies signals combined by the combining circuit are mounted.

Another aspect of the present disclosure provides an information processing apparatus being installed in a moving body, the information processing apparatus including: an antenna that includes a patch electrode which has at least four feeding terminals and a circuit substrate which has substrate-side feeding terminals which are electrically connected respectively with the four feeding terminals in a one-to-one manner, a phase circuit which performs a phase shift for signals output from the substrate-side feeding terminals, a combining circuit which combines signals for which the phase shift is performed by the phase circuit, and an amplifier circuit which amplifies signals combined by the combining circuit; and a position information processing circuit which calculates position information of the moving body based on a signal output from the antenna.

Another aspect of the present disclosure provides a composite antenna apparatus including: a first antenna for a satellite positioning system, the first antenna having a patch electrode which has four feeding terminals and a circuit substrate which performs signal processing for a reception signal from the patch electrode; a second antenna which receives a signal in a frequency band different from the first antenna; an antenna base on which the first antenna and the second antenna are situated; and an antenna casing which accommodates, together with the antenna base, the first antenna and the second antenna.

Advantageous Effects of the Invention

In the present disclosure, compared to one-point feeding or two-point feeding, an axial ratio is improved for wide elevation angles and wide frequencies, and contribution can thereby be made to realization of a further improvement in position accuracy of a moving body. Further, because an antenna is adapted to multiple frequencies, it is not necessary to provide plural antennas adapted to the respective frequencies, thus the present disclosure can contribute to space saving.

DESCRIPTION OF EMBODIMENT

Figure 1:
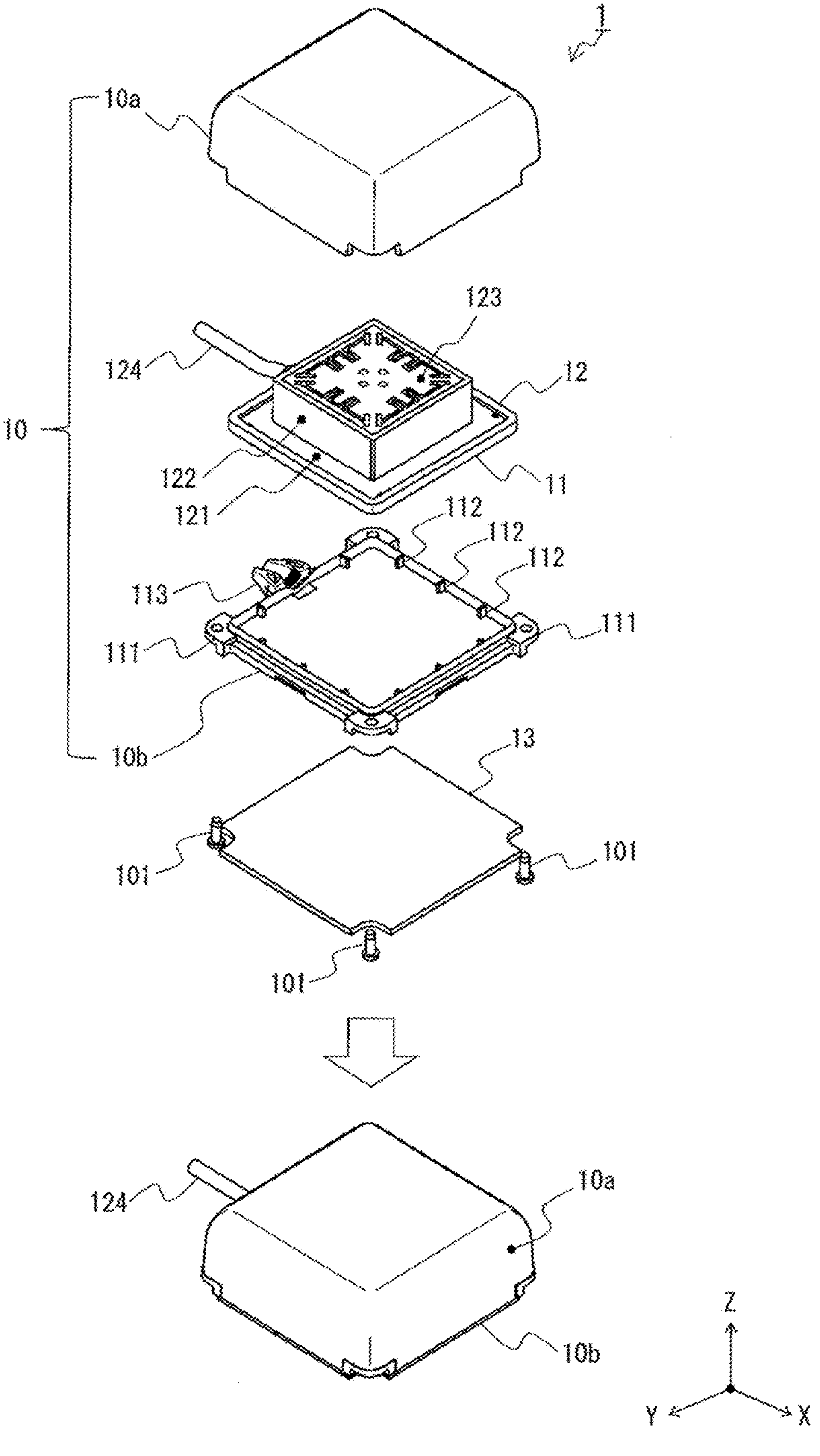
FIG. 1 is an exploded diagram of an antenna of the present embodiment.

Hereinafter, as an example, as to a case where the present disclosure is applied to an antenna for a satellite positioning system (hereinafter, simply referred to as antenna), an embodiment thereof will be described with reference to drawings. In this case, the antenna is capable of simultaneously receiving two frequency bands of an L1 band (1,560 to 1,605 MHz) of a GNSS (global navigation satellite system) and an L5 band (1,150 to 1,210 MHz) of the GNSS, or two frequency bands of the L1 band of the GNSS and an L2 band (1,197 to 1,260 MHz) of the GNSS. In the present embodiment, for convenience of description, orthogonal three-dimensional axes of an X axis, a Y axis, and a Z axis are illustrated in the drawings. The X axis represents a longitudinal direction of the antenna, the Y axis represents a width direction of the antenna, and the Z axis represents a zenith (perpendicularly upper) direction. Further, a +Z axis direction may be referred to as "up", "upper side", "zenith", or "zenith direction", viewing the antenna from the upper side may be expressed as "top view", and viewing the antenna from the Y axis may be expressed as "side view".

A component structure example of the antenna of the present embodiment is illustrated in FIG. 1. FIG. 1 is an exploded diagram of an antenna 1. Referring to FIG. 1, the antenna 1 is configured to accommodate a GNSS substrate assembly 12, which is sealed in an airtight and watertight manner by packing 11 as a buffer body, in an antenna casing 10.

The antenna casing 10 is an electric wave transmitting housing which is configured with a top cover 10*a* and a base cover 10*b*. The top cover 10*a* has slightly rounded side portions and a square-shaped opening and is a rigid resin box, for example, a plastic box, in a tubular shape which has a bottom and whose upper bottom portion has a general square shape, and four corner portions of the opening are equivalently notched. Further, in an inner end portion of each of the corner portions, a screw hole corresponding to each screw 101 is threaded. The base cover 10*b* is a generally square annular body, and in four corner portions, projection portions 111 are formed which are used for positioning with the top cover 10*a* and through which the screws 101 are caused to pass.

The projection portion 111 is shaped to have such shape and size that the projection portion 111 seals each of the four corner portions of the top cover 10*a* when the base cover 10*b* is covered by the top cover 10*a*. Ribs 112 for supporting a GNSS substrate assembly 12 are formed on the inside of four sides among the corner portions of the base cover 10*b*, and a cable guide 113 which has a recess is formed in one of those sides. The recess of the cable guide 113 is shaped to have a diameter which is equivalent to or less than an outer diameter of a feeding cable 124 described later. In other words, the recess is shaped to retain the feeding cable 124 pushed thereinto.

The GNSS substrate assembly 12 is configured with a circuit substrate 121 formed with a thin insulation plate which has front and back surfaces, a dielectric 122 which is placed in an almost central portion of the front surface of the circuit substrate 121, a patch electrode 123 which is attached to a front surface of the dielectric 122, a feeding cable 124, and the packing 11 which is configured with a soft insulator such as rubber or silicon.

On the back surface of the circuit substrate 121, a feeding unit including four substrate-side feeding terminals is formed. The feeding unit will later be described in detail. One end of the feeding cable 124 is made electrically connected with an output unit of the feeding unit, and another end is supported by the cable guide 113 of the base cover 10*b* and is exposed to an outer portion of the antenna casing 10. Further, airtightness and watertightness of one end of the feeding cable 124 are retained by the packing 11. The GNSS substrate assembly 12 is not limited to the above shape. Four corner portions of an attachment tape 13 for causing the screws 101 to pass through the holes of the projection portions 111 of the base cover 10*b* are notched inward in arc shapes, and the attachment tape 13 is pasted onto a back surface of the base cover 10*b*.

Figure 2:
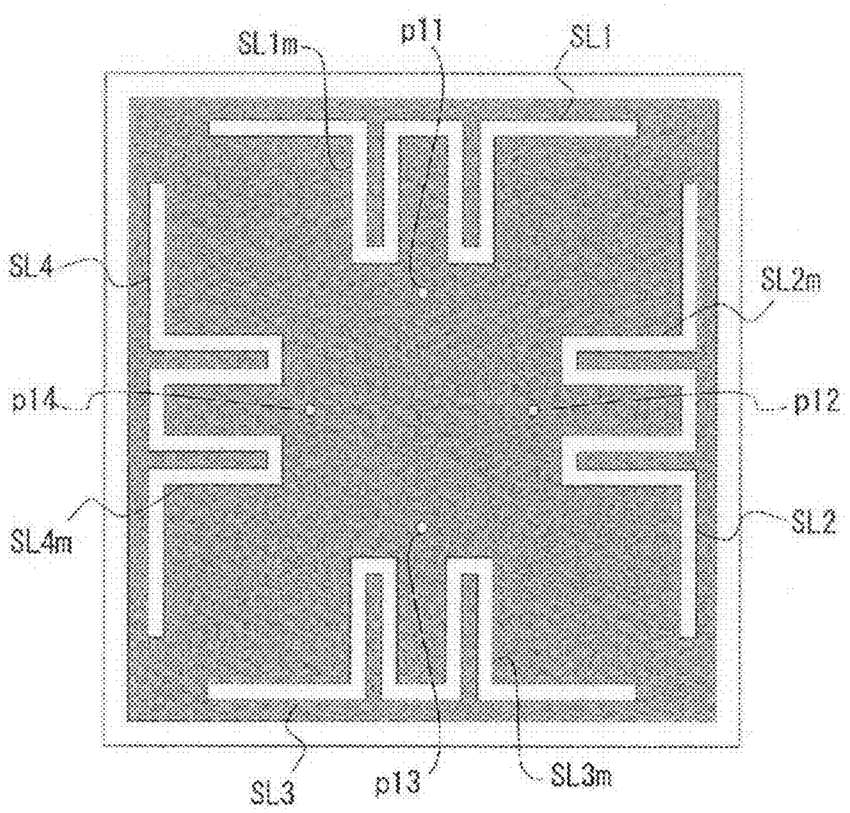
FIG. 2 is a diagram illustrating a patch electrode provided to the antenna of the present embodiment.

The patch electrode 123 is a square-shaped metal plate which is generally parallel with a ground conductor (for example, a vehicle roof) and is fixed to a portion on a slightly inner side of an outer periphery of a front surface of the dielectric 122. A structure example of the patch electrode 123 is illustrated in FIG. 2. In the example of FIG. 2, in the patch electrode 123, in positions at equivalent distances from a center point of thereof, at equivalent intervals, and in point symmetry, four electrode-side feeding terminals p11, p12, p13, and p14 are formed which correspond to the four substrate-side feeding terminals of the circuit substrate 121 in a one-to-one manner.

The distance between the center point of the patch electrode 123 and the position of each of the electrode-side feeding terminals p11, p12, p13, and p14 is set to a distance at which impedance matching (for example, 50 ohms) of the patch electrode 123 is achieved in a used frequency band.

On an inner side of an outer periphery of the patch electrode 123, four slots SL1, SL2, SL3, and SL4 are formed along sides of a square and on the outside with respect to the electrode-side feeding terminals p11, p12, p13, and p14. The "slot" denotes a portion in which the metal plate is notched. The slots SL1, SL2, SL3, and SL4 are positioned in line symmetry with respect to a symmetry axis which passes through the center point of the patch electrode 123 and in point symmetry with respect to the center point.

Further, in the four slots SL1, SL2, SL3, and SL4, meandering (winding) portions SL1*m*, SL2*m*, SL3*m*, and SL4*m* are formed in generally intermediate positions of straight line portions which are parallel with respective sides. The electrode-side feeding terminals p11, p12, p13, and p14 are formed in almost central portions of the closest meandering (winding) portions SL1*m*, SL2*m*, SL3*m*, and SL4*m*.

The meandering portions SL1*m*, SL2*m*, SL3*m*, and SL4*m* are formed to make electrical lengths longer and to make transmission and/or reception frequencies lower than a case where those are absent. Thus, sizes of the meandering portions SL1*m*, SL2*m*, SL3*m*, and SL4*m* are appropriately adjusted after manufacturing or before manufacturing, fine adjustment of frequencies at which transmission and/or reception are possible thereby becomes possible, design flexibility is increased, and flexible adaptation to requested transmission and/or reception bands becomes possible.

One feature of the antenna 1 of the present embodiment is the point that the patch electrode 123 is present in which the four slots SL1, SL2, SL3, and SL4 conforming to resonance conditions of desired frequencies, the four electrode-side feeding terminals p11, p12, p13, and p14 are one by one present at equivalent distances from the center point of the patch electrode 123, and feeding phases (phases in feeding, the same applies to the following) at the electrode-side feeding terminals p11, p12, p13, and p14 are different by 90 degrees from the feeding phases of the other neighboring electrode-side feeding terminals p11, p12, p13, and p14.

Thus, the patch electrode 123 performs an antenna action for transmitting and/or receiving electric waves at frequencies which satisfy resonance conditions based on the length of one side of the square and on permittivity of the dielectric 122, and a slot action for transmitting and/or receiving electric waves at frequencies which satisfy resonance conditions even in consideration of electrical lengths of the slots SL1, SL2, SL3, and SL4 and the meandering portions SL1*m*, SL2*m*, SL3*m*, and SL4*m*. In other words, the patch electrode 123 performs a "double resonance" action.

In the antenna action, the frequency which satisfies the resonance conditions is a frequency at which an electrical length defined by the length of one side of the patch electrode 123 and by the permittivity of the dielectric 122 becomes approximately ½ wavelength (and its integer multiples). In the slot action, the frequency which satisfies the resonance conditions is a frequency at which an electrical length defined by the whole length of each of the meandering portions SL1*m*, SL2*m*, SL3*m*, and SL4*m* and slots SL1, SL2, SL3, and SL4 and by the permittivity of the dielectric 122 becomes approximately ½ wavelength (and its integer multiples).

The whole length of each of the meandering portions SL1*m*, SL2*m*, SL3*m*, and SL4*m* and slots SL1, SL2, SL3, and SL4 is a length from one end to the other end of an edge of the slot or a length from one end to the other end of an edge of the meandering portion, for example.

Because four-point feeding is performed at the positions in line symmetry and point symmetry while phase shifts of 90 degrees are sequentially performed between the neighboring electrode-side feeding terminals at equivalent amplitudes, an electric wave to be received by the patch electrode becomes a circularly polarized wave. In a case where the phase shifts are performed in right-handed rotation, the electric wave becomes a right-handed circularly polarized wave. In a case of left-handed rotation, the electric wave becomes a left-handed circularly polarized wave.

In other words, in the present embodiment, it becomes easy to realize reception of circularly polarized waves at two frequency bands (for example, the L1 band and the L5 band or the L1 band and the L2 band) of the GNSS by one antenna 1.

In the present embodiment, a description is made about a case where the slots in which the meandering portions are formed are mounted along the respective sides of the square of the patch electrode; however, as long as the slots are positioned in line symmetry with respect to the symmetry axis passing through the center point of the patch electrode 123 and in point symmetry with respect to the center point, the slots may have any shape (for example, shapes in which no meandering portion is provided) and may be positioned in any part (for example, parts along respective corner portions of the square of the patch electrode).

Next, a feeding unit 20 mounted on the circuit substrate 121 will be described.

Figure 3:
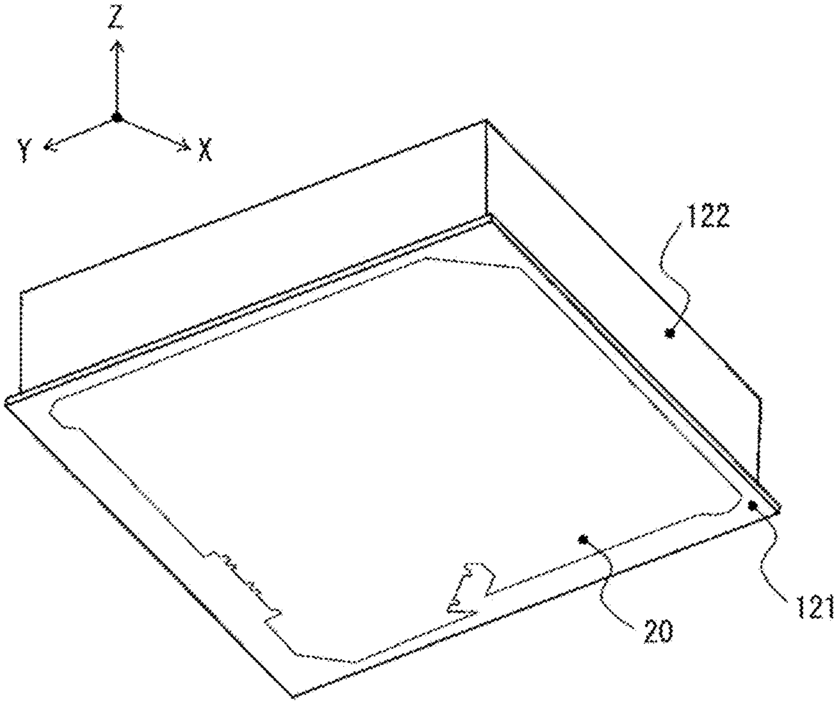
FIG. 3 is a perspective view illustrating a situation where a feeding unit is attached to a circuit substrate.

FIG. 3 is a perspective view illustrating a situation where the feeding unit 20 is mounted on the back surface of the circuit substrate 121. Although details are not illustrated in FIG. 3, the feeding unit 20 is configured with a lumped constant circuit which includes distributed constant lines (conductor pattern group) formed by printing on the back surface of the circuit substrate 121 and passive elements. The feeding unit 20 is configured with a feeding circuit 20*a* that is configured with four substrate-side feeding terminals, four matching circuits, six phase shifters, and two combiners, which will be described later, and an LNA (low-noise amplifier).

The whole feeding circuit 20*a* may be configured with distributed constant lines.

Figure 4:
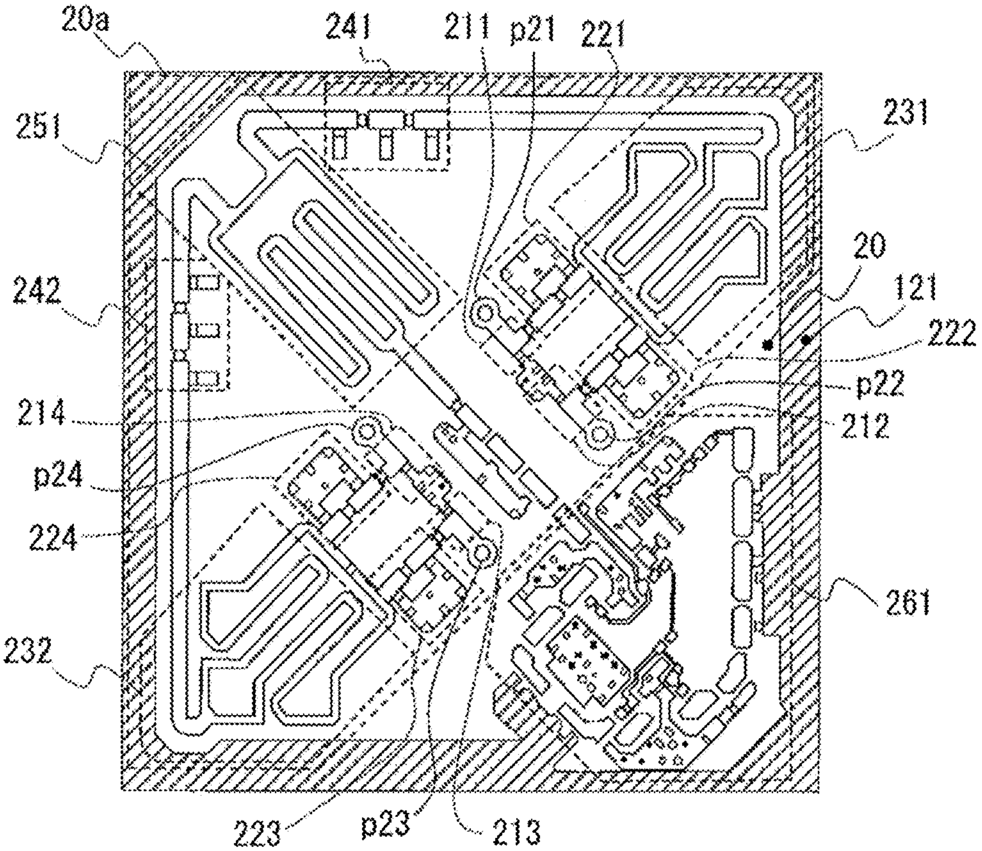
FIG. 4 is a diagram illustrating a conductor pattern of the feeding unit.
Figure 5:
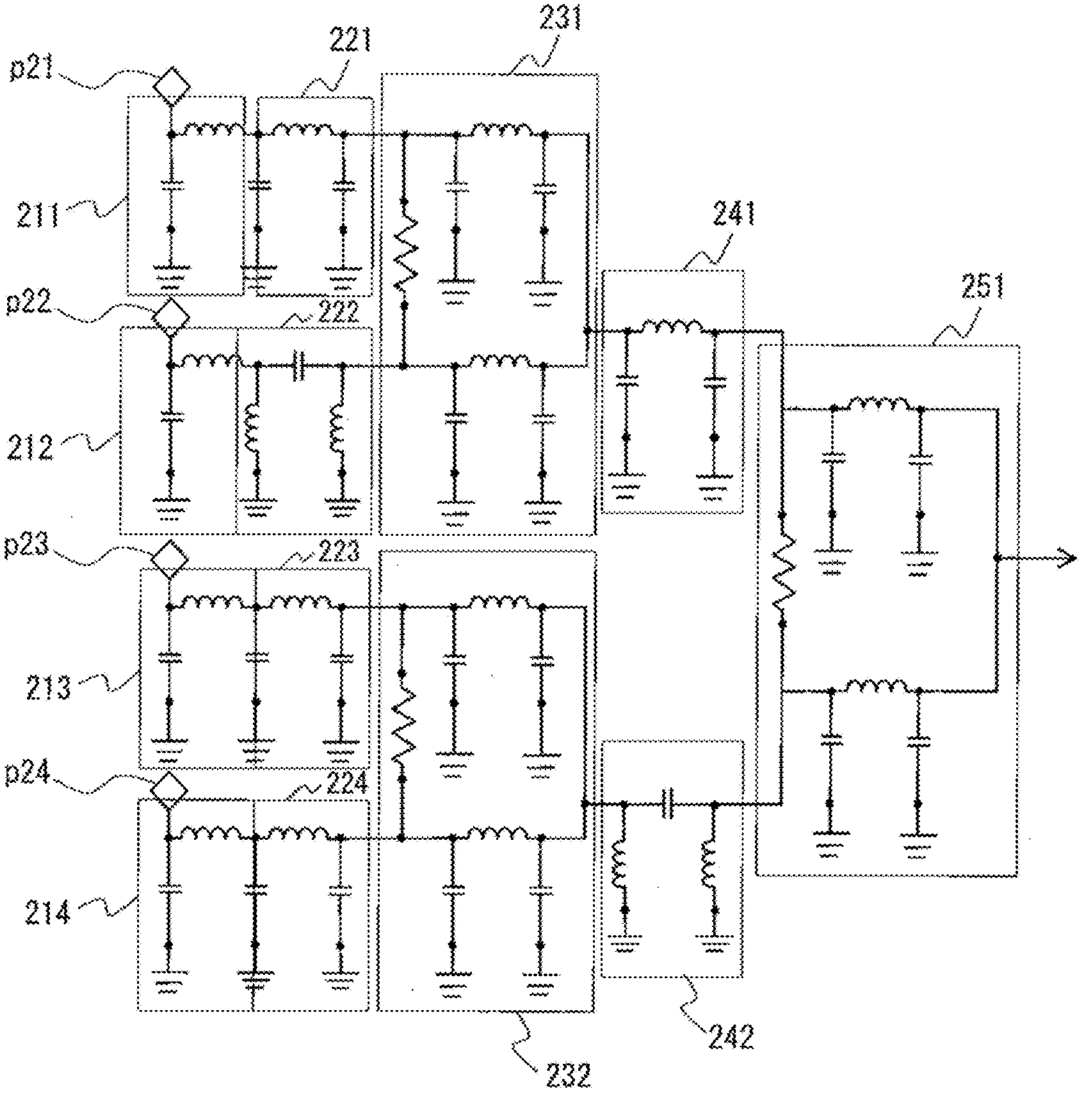
FIG. 5 is a diagram illustrating a feeding circuit by an equivalent circuit.
Figure 6:
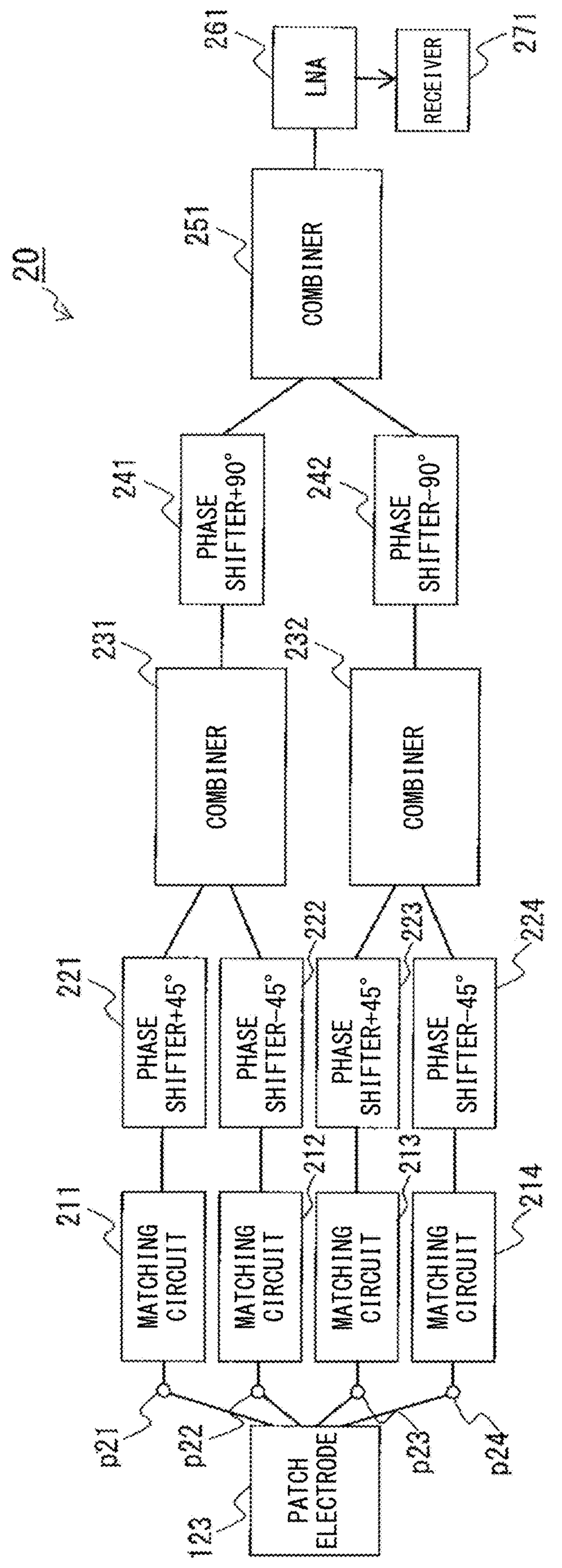
FIG. 6 is a block diagram of the feeding unit and a receiver.

A conductor pattern of the feeding unit 20 is illustrated in FIG. 4. FIG. 5 illustrates the feeding circuit 20*a* in the feeding unit 20 illustrated in FIG. 4 by an equivalent circuit, and FIG. 6 is a block diagram illustrating the feeding unit 20 illustrated in FIG. 4 and a receiver 271 connected with that. For convenience, the same reference signs are given to corresponding components. In the following, comprehensively referring to FIGS. 4, 5, and 6, a configuration of the feeding unit 20 in the present embodiment will be described.

In the feeding unit 20, four substrate-side feeding terminals p21, p22, p23, and p24 are formed in the same positions, in the feeding circuit 20*a* in a top view, as the positions of the four electrode-side feeding terminals p11, p12, p13, and p14 which are formed on the patch electrode 123. The electrode-side feeding terminal p11 and the substrate-side feeding terminal p21, the electrode-side feeding terminal p12 and the substrate-side feeding terminal p22, the electrode-side feeding terminal p13 and the substrate-side feeding terminal p23, and the electrode-side feeding terminal p14 and the substrate-side feeding terminal p24, which are respectively closest to one another, are directly made electrically continuous and connected together by conductive pins or the like.

Matching circuits 211, 212, 213, and 214 are made electrically connected with the four substrate-side feeding terminals p21, p22, p23, and p24 in a one-to-one manner with respect to their corresponding lines. The matching circuits 211, 212, 213, and 214 are circuits which perform impedance matching between the patch electrode 123 and the feeding unit 20, and all of the four circuits are configured with lumped constant circuits in a conductor pattern having the same shape and area and in the same arrangement relationship. A phase shifter 221 which performs a phase shift of +45 degrees is connected with the matching circuit 211, a phase shifter 222 which performs a phase shift of −45 degrees is connected with the matching circuit 212, a phase shifter 223 which performs a phase shift of +45 degrees is connected with the matching circuit 213, and a phase shifter 224 which performs a phase shift of −45 degrees is connected with the matching circuit 214. In the present embodiment, a description will be made about a configuration which uses the matching circuits 211, 212, 213, and 214, however, the present disclosure is capable of being carried out without those matching circuits.

The matching circuits 211, 212, 213, and 214 perform impedance matching for respective reception signals (power), which are four equal parts resulting from division by the patch electrode 123, and output the respective reception signals to the phase shifters 221, 222, 223, and 224 in rear stages. The phase shifter 221 performs a phase shift of +45 degrees for the reception signal (power) output from the matching circuit 211 and outputs the reception signal to a combiner 231 in a rear stage. Similarly, the phase shifter 222 performs a phase shift of −45 degrees for the reception signal (power) output from the matching circuit 212 and outputs the reception signal to the combiner 231 in the rear stage. The phase shifter 223 performs a phase shift of +45 degrees for the reception signal (power) output from the matching circuit 213 and outputs the reception signal to a combiner 232 in a rear stage. The phase shifter 224 performs a phase shift of −45 degrees for the reception signal (power) output from the matching circuit 214 and outputs the reception signal to the combiner 232 in the rear stage.

As illustrated in FIG. 5, each of the phase shifters 221, 222, 223, and 224 is a π type circuit in this example, and its cutoff frequency (critical frequency) is an arbitrary frequency of a GNSS frequency band and is set to a frequency near a band edge of the GNSS frequency band in this example. Either one of a high-pass filter and a low-pass filter or a T type circuit may be used for the phase shifters 221, 222, 223, and 224. The phase shifters 221, 222, 223, and 224 in the present embodiment correspond to first phase shifters.

The combiner 231 accepts inputs of two reception signals (power) output from the phase shifter 221 and the phase shifter 222 and combines those into one signal. Further, the combiner 232 accepts inputs of two reception signals (power) output from the phase shifter 223 and the phase shifter 224 and combines those into one signal. As a circuit, as illustrated in FIG. 5, each of the combiners is configured with two π type circuits and a resistor. The π type circuits are connected together in parallel with each other, and the resistor is connected between input terminals of the π type circuits. A cutoff frequency (critical frequency) of the t type circuit is an arbitrary frequency of the GNSS frequency band and is set to a frequency near the band edge of the GNSS frequency band in this example. Either one of a high-pass filter and a low-pass filter or a T type circuit may be used for the π type circuit. The combiners 231 and 232 in the present embodiment correspond to first combining circuits.

An output of the combiner 231 is input to a phase shifter 241. Further, an output of the combiner 232 is input to a phase shifter 242. The phase shifter 241 performs a phase shift of +90 degrees for an input reception signal (power) and outputs the reception signal to a combiner 251 in a rear stage. The phase shifter 242 performs a phase shift of −90 degrees for an input reception signal (power) and outputs the reception signal to the combiner 251 in the rear stage. The combiner 251 accepts inputs of the reception signals (power) output from the phase shifter 241 and the phase shifter 242, combines those reception signals (power), and outputs a combined reception signal to an LNA 261. The LNA 261 amplifies the combined reception signal (power) at a predetermined amplification factor and outputs the combined reception signal to the receiver 271 in a rear stage. The combiners 231, 232, and 251 are Wilkinson dividers, for example. The phase shifters 241 and 242 in the present embodiment correspond to second phase circuits, and the combiner 251 corresponds to a second combining circuit.

Next, the receiver 271 will be described. The receiver 271 has a position information processing circuit which extracts a digital signal from a reception signal (power) output from the feeding unit 20 and in real time calculates a present position of a moving body based on the extracted digital signal. A position calculation algorithm is incorporated in the position information processing circuit, and the position information processing circuit outputs time information and present position information. The receiver 271 may be mounted on the circuit substrate 121 but may be mounted on another circuit substrate on the outside of the antenna casing 10. An information processing apparatus which calculates position information of a moving body such as a vehicle to which the antenna 1 is attached is configured with the antenna 1 and the receiver 271 having the position information processing circuit.

Antenna Characteristics

Figure 7A:
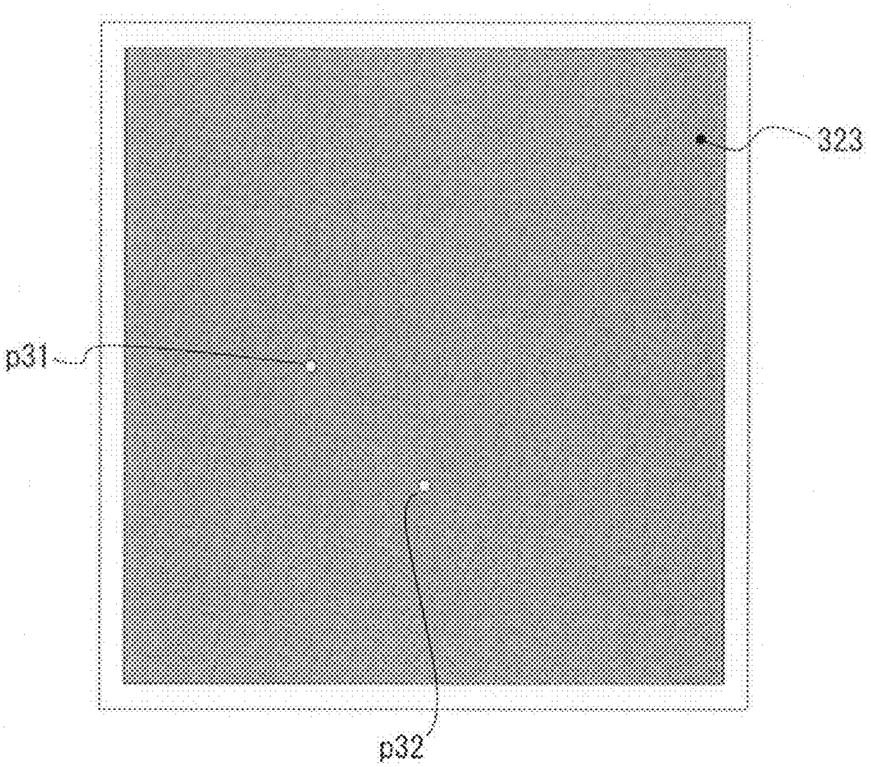
FIG. 7A is a diagram illustrating a two-feed patch electrode as a reference example.
Figure 7B:
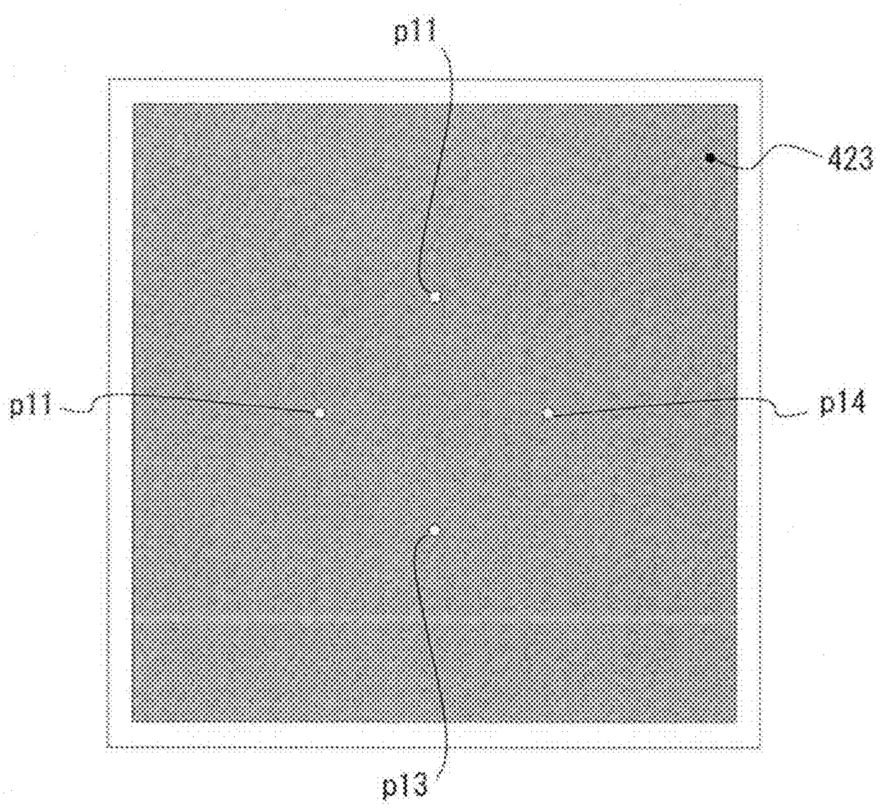
FIG. 7B is a diagram illustrating a four-feed patch electrode as a reference example.
Figure 8:
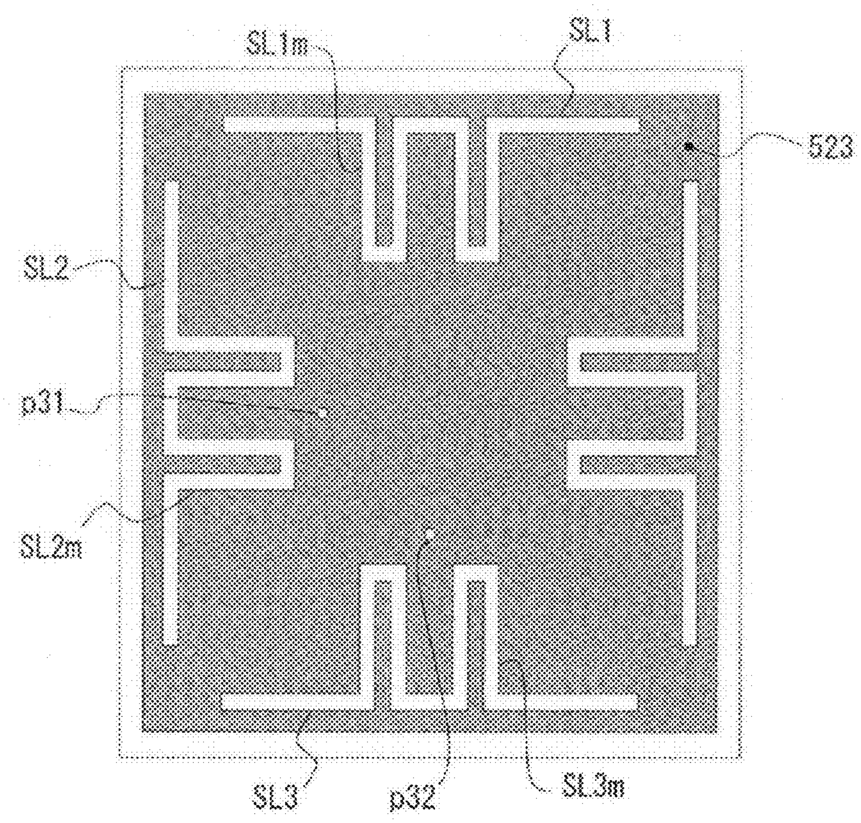
FIG. 8 is a diagram illustrating a patch electrode with two-feed slots as a reference example.

In the following, a description will be made about antenna characteristics of the antenna 1 of the present embodiment which is configured as described above. A simulator was used for an analysis of the antenna characteristics, and a simulation was performed by using a ground conductor with a diameter of 15 cm. Here, in order to compare characteristics in accordance with features, a description will be made about antennas that respectively have a reference example electrode 323 without two-feed slots which is illustrated in FIG. 7A, a reference example electrode 423 without four-feed slots which is illustrated in FIG. 7B, and a reference example electrode 523 with the two-feed slots which is illustrated in FIG. 8.

The reference example electrodes 323, 423, and 523 have the same materials, shapes, and outer periphery sizes as the patch electrode of the present embodiment which is illustrated in FIG. 2. The patch electrode 523 is the same as the patch electrode 123 illustrated in FIG. 2 except that two electrode-side feeding terminals p31 and p32 are present. It is assumed that the two-feed reference example electrodes 323 and 523 are made electrically connected with a two-feed feeding circuit 30 illustrated in FIG. 9 and the four-feed reference example electrode 423 is made electrically connected with the feeding circuit 20*a* illustrated in FIGS. 4, 5, and 6.

Figure 9:
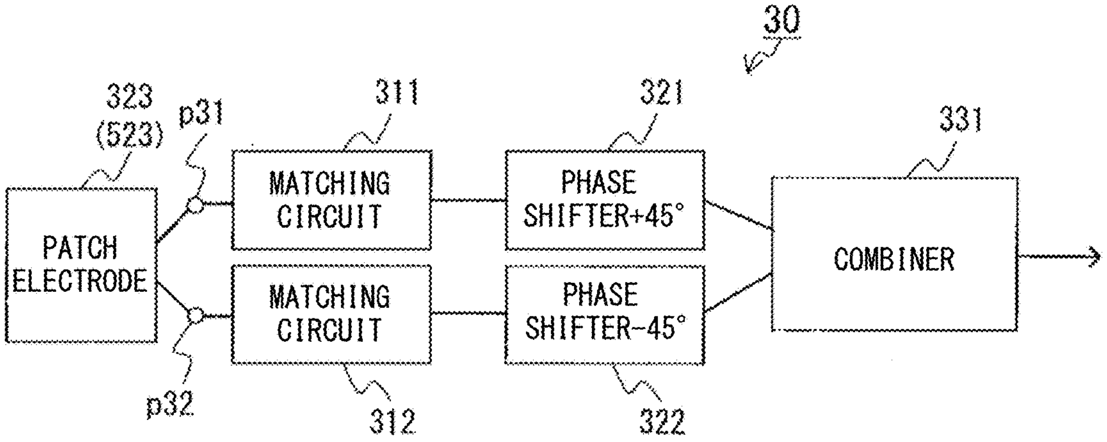
FIG. 9 is a block diagram of a feeding circuit corresponding to the patch electrode with the two-feed slots.

The feeding circuit 30 illustrated in FIG. 9 performs impedance matching for reception signals (power), which are two equal parts resulting from division by the antenna, by the matching circuits 311 and 312 and thereafter outputs the reception signals to phase shifters 321 and 322. The feeding circuit 30 is different from the feeding circuit 20*a* illustrated in FIGS. 3, 4, 5, and 6 in the point that the phase shifters 321 and 322 perform phase shifts of 45 degrees in mutually opposite directions for the reception signals (power) from the matching circuits 311 and 312 and a combiner 331 combines those reception signals (power). For convenience of a comparative description, the antenna which has the reference example electrode 323 may be abbreviated as “two-feed (type)”, the antenna which has the reference example electrode 423 may be abbreviated as “four-feed (type)”, the antenna which has the reference example electrode 523 may be abbreviated as “two-feed double resonance (type)”, and the antenna 1 which has the patch electrode 123 of the present embodiment may be abbreviated as “four-feed double resonance (type)”.

Figure 10A:
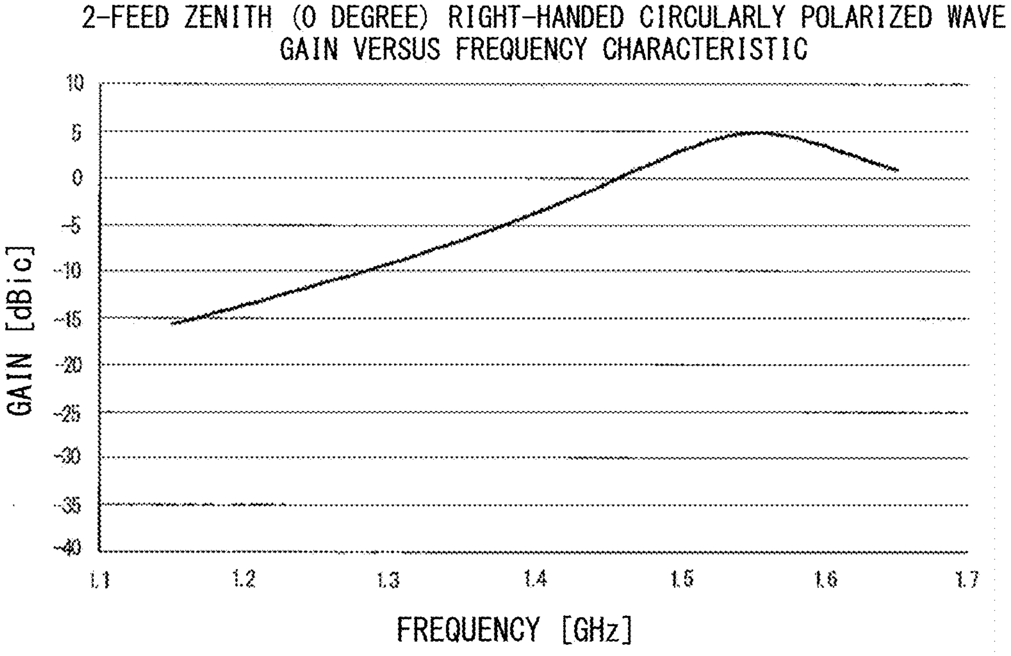
FIG. 10A is a right-handed circularly polarized wave gain versus frequency characteristic diagram at zenith (zero degree) in a two-feed type.
Figure 10B:
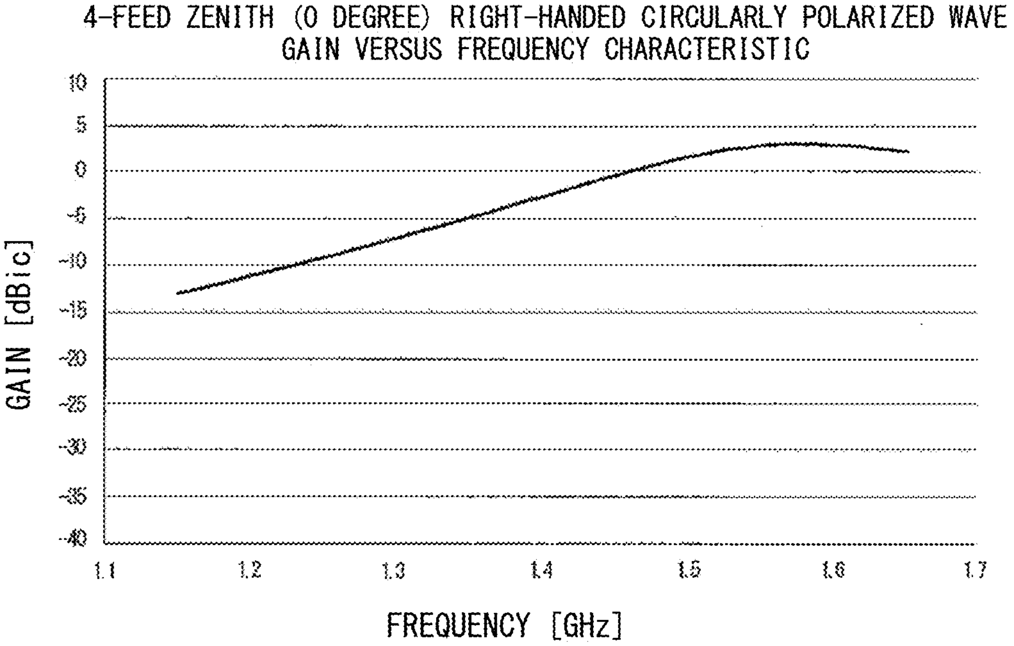
FIG. 10B is a right-handed circularly polarized wave gain versus frequency characteristic diagram at the zenith (zero degree) in a four-feed type.

FIG. 10A and FIG. 10B are right-handed circularly polarized wave gain versus frequency characteristic diagrams at zenith (zero degree) in the two-feed type and in the four-feed type, respectively, vertical axes represent gain (dBic), and horizontal axes represent frequency band (GHz). The “zenith (zero degree)” denotes a direction of the Z axis. In the four-feed type, although a size of a patch electrode and a height from a ground conductor are the same compared to the two-feed type, the gain is high throughout the whole range of the GNSS frequency band, and the difference between the maximum gain and the minimum gain in the GNSS frequency band is small. In other words, it can be understood that a broader band is intended by the four-feed.

Figure 11A:
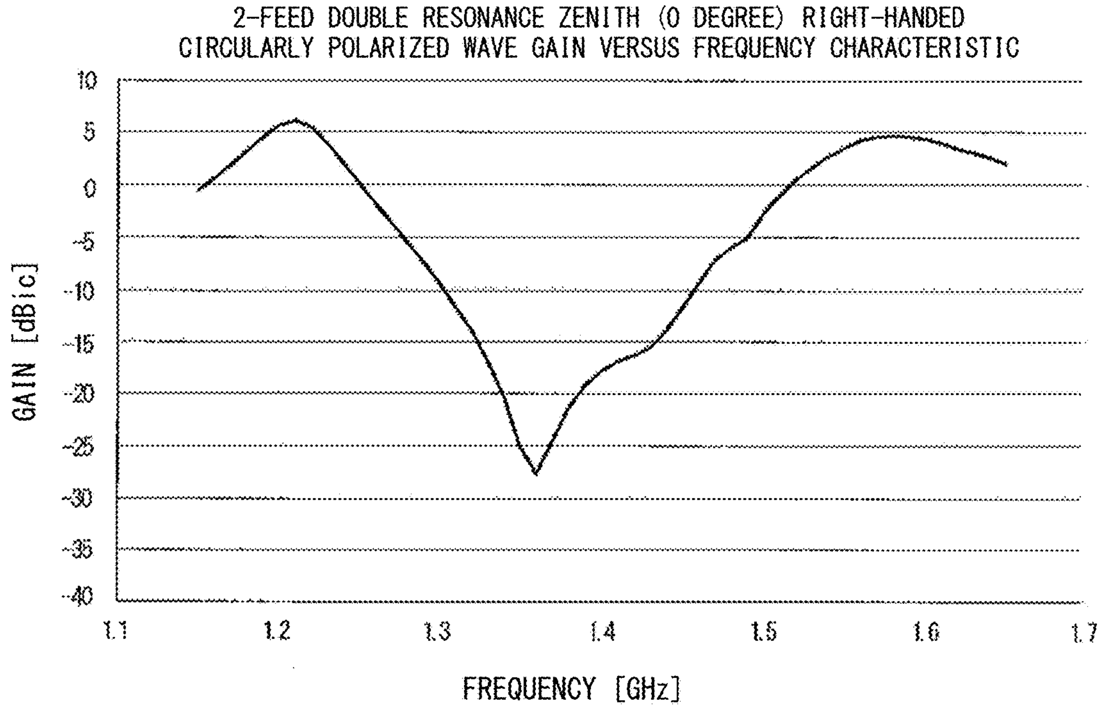
FIG. 11A is a right-handed circularly polarized wave gain versus frequency characteristic diagram at the zenith (zero degree) in a two-feed double resonance type.
Figure 11B:
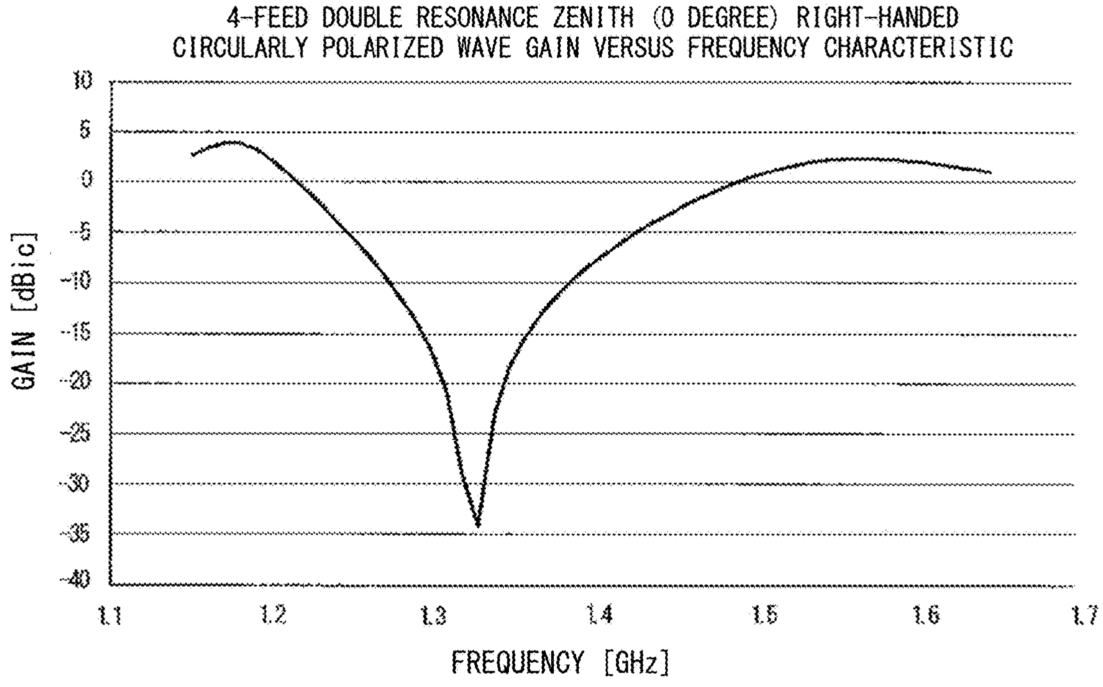
FIG. 11B is a right-handed circularly polarized wave gain versus frequency characteristic diagram at the zenith (zero degree) in a four-feed double resonance type.

FIG. 11A and FIG. 11B are right-handed circularly polarized wave gain versus frequency characteristic diagrams at the zenith (zero degree) in the two-feed double resonance type and in the four-feed double resonance type, respectively, and vertical axes and horizontal axes are the same as FIG. 10A and FIG. 10B. Due to influences of the slots SL1, SL2, SL3, and SL4, the gain at a practical level can be obtained in the L1 band (1,560 to 1,605 MHz) of the GNSS, the L5 band (1,150 to 1,210 MHz) of the GNSS, and the L2 band (1,197 to 1,260 MHz) of the GNSS, but in the four-feed double resonance type as the present embodiment, lowering of the gain around each of the bands becomes mild. In other words, it can be understood that a broader band is intended by the four-feed in a double resonance type.

Figure 12A:
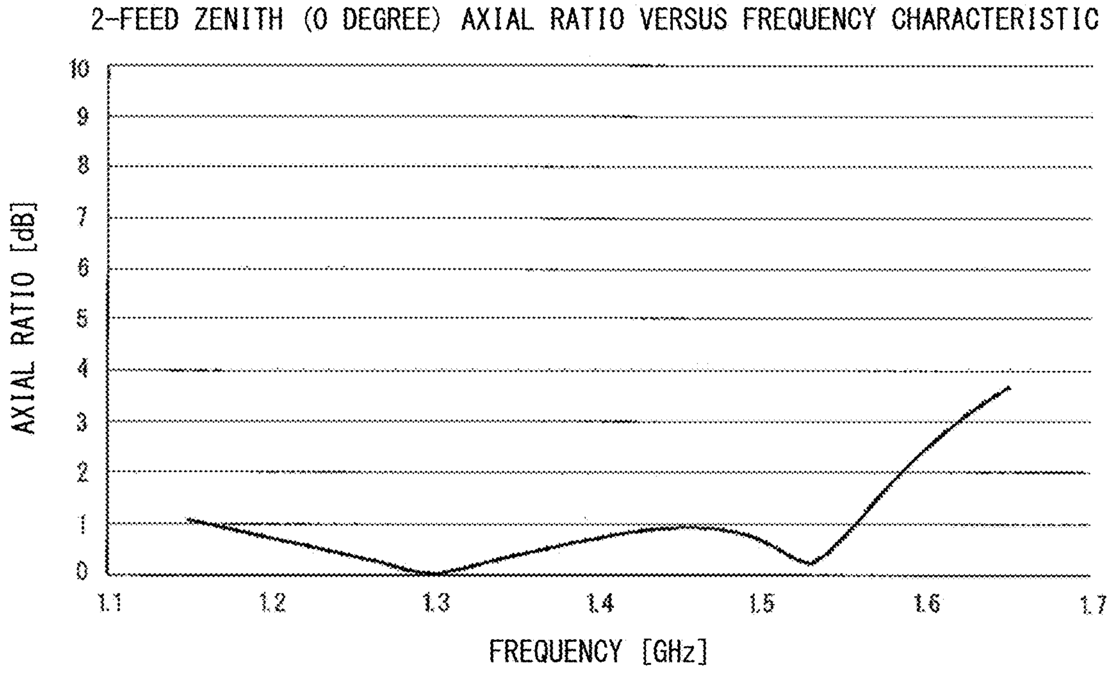
FIG. 12A is an axial ratio versus frequency characteristic diagram at the zenith (zero degree) in the two-feed type.
Figure 12B:
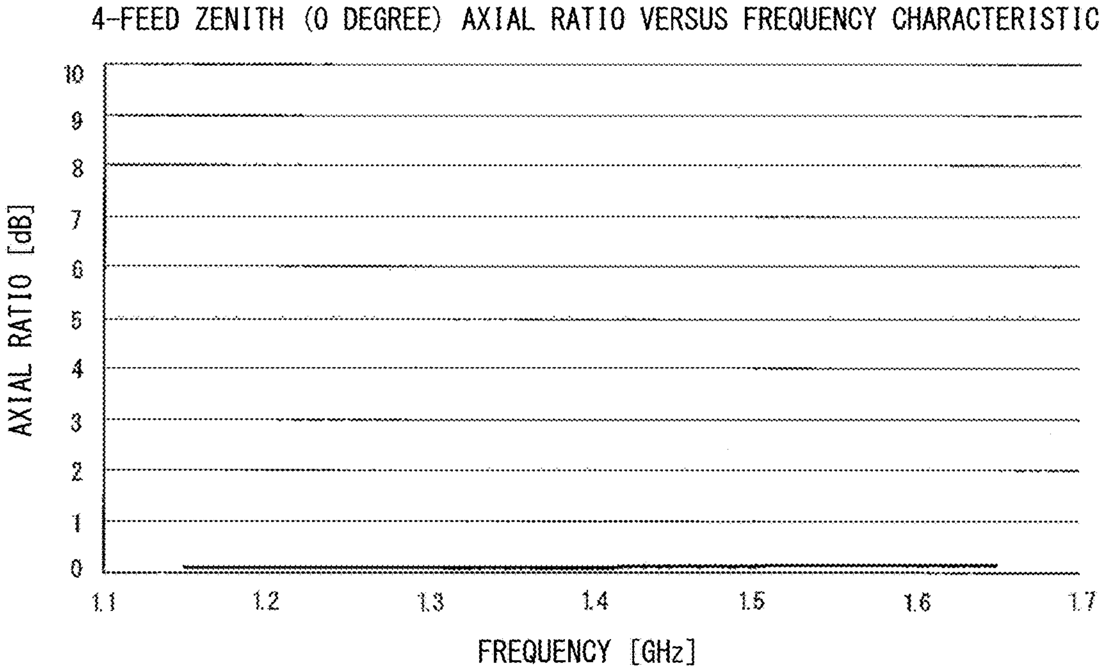
FIG. 12B is an axial ratio versus frequency characteristic diagram at the zenith (zero degree) in the four-feed type.

FIG. 12A and FIG. 12B are axial ratio versus frequency characteristic diagrams at the zenith (zero degree) in the two-feed type and in the four-feed type, respectively, vertical axes represent axial ratio (dB), and horizontal axes represent frequency band (GHz). It can be understood that in the two-feed type, the axial ratio (dB) around the L1 band and at a part of other frequencies is lowered but in the four-feed type, the axial ratio is significantly improved not only in the GNSS frequency band of the L5 band but also throughout the whole frequency band.

Figure 13A:
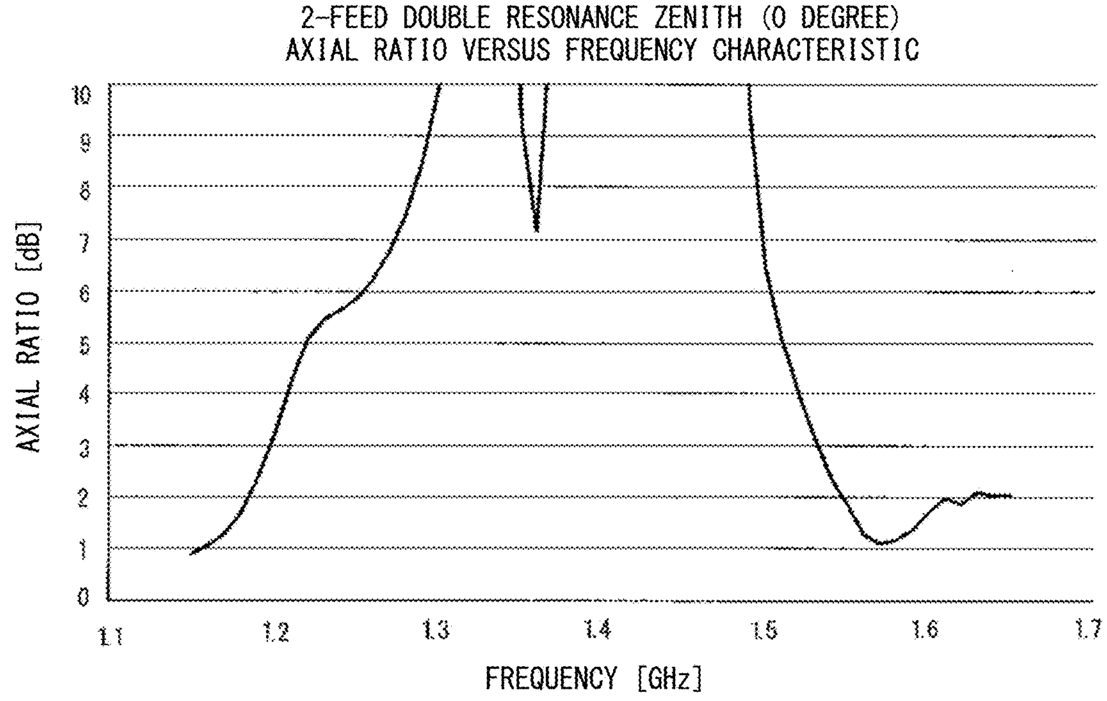
FIG. 13A is an axial ratio versus frequency characteristic diagram in the two-feed double resonance type.
Figure 13B:
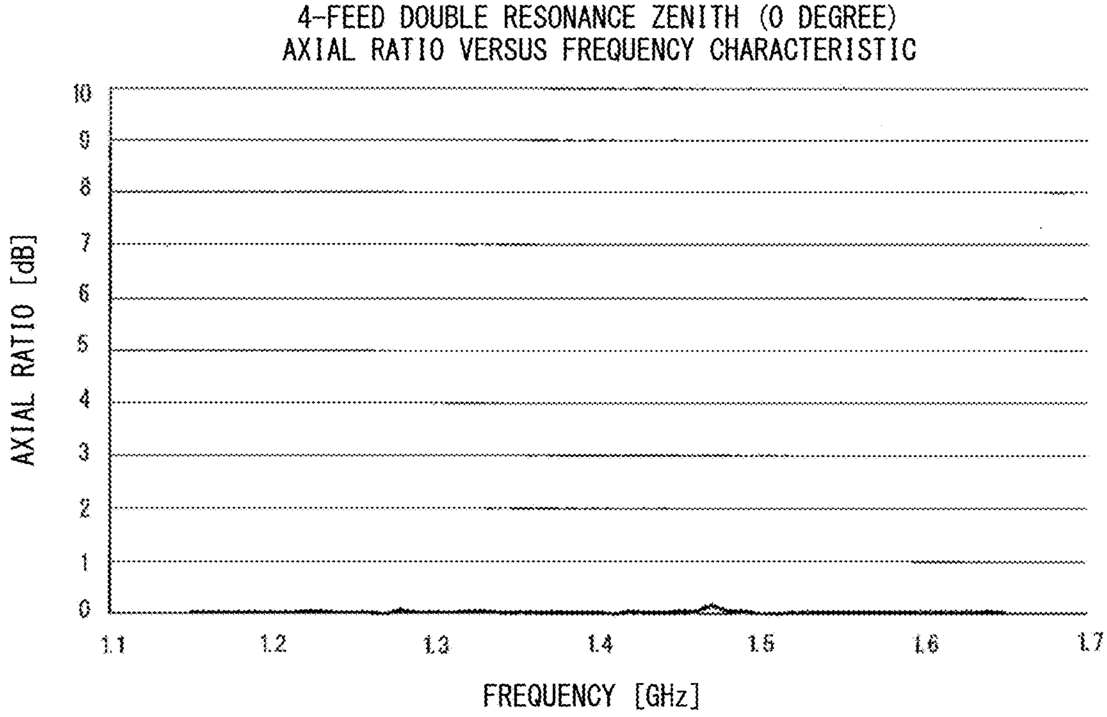
FIG. 13B is an axial ratio versus frequency characteristic diagram in the four-feed double resonance type.

FIG. 13A and FIG. 13B are axial ratio versus frequency characteristic diagrams in the two-feed double resonance type and in the four-feed double resonance type, respectively, and vertical axes and horizontal axes are the same as FIG. 12A and FIG. 12B. In the two-feed double resonance type, the influences of the slots SL1, SL2, SL3, and SL4 are enormously large, and the axial ratio becomes 1 (dB) or higher in all bands of the L1 band of the GNSS, the L5 band of the GNSS, and the L2 band of the GNSS, but in the four-feed double resonance type, almost the same characteristic as FIG. 12B can be obtained. In other words, it can be understood that the four-feed double resonance type is hardly influenced by the slots SL1, SL2, SL3, and SL4.

Figure 14A:
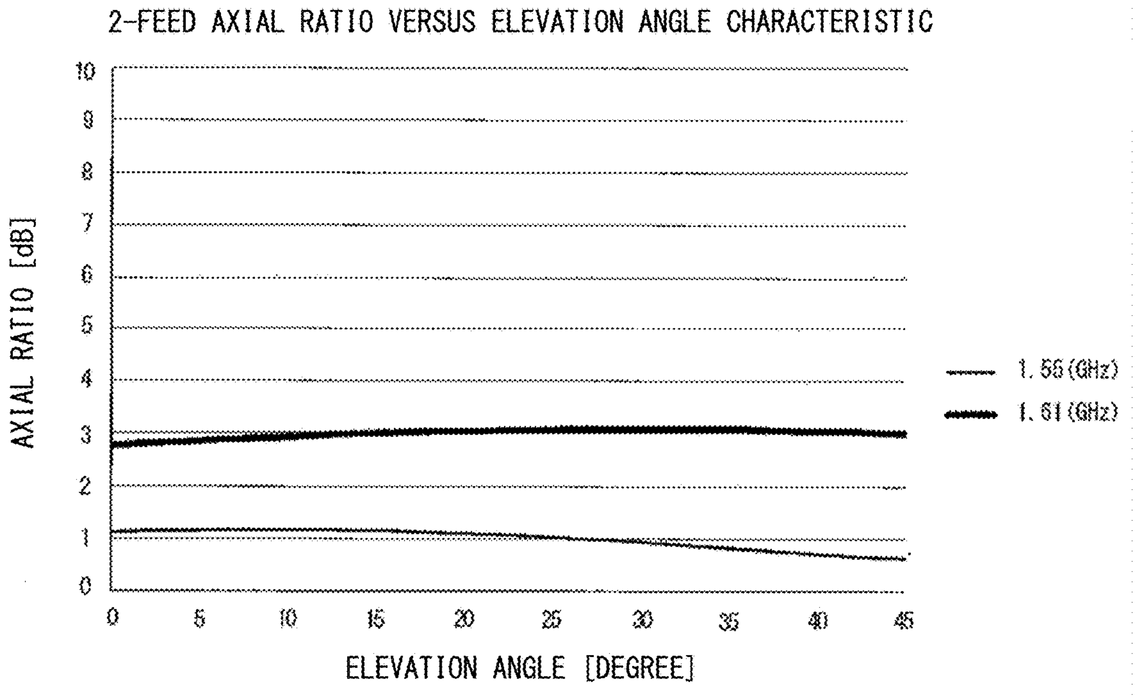
FIG. 14A is an axial ratio versus elevation angle characteristic diagram in the two-feed type.
Figure 14B:
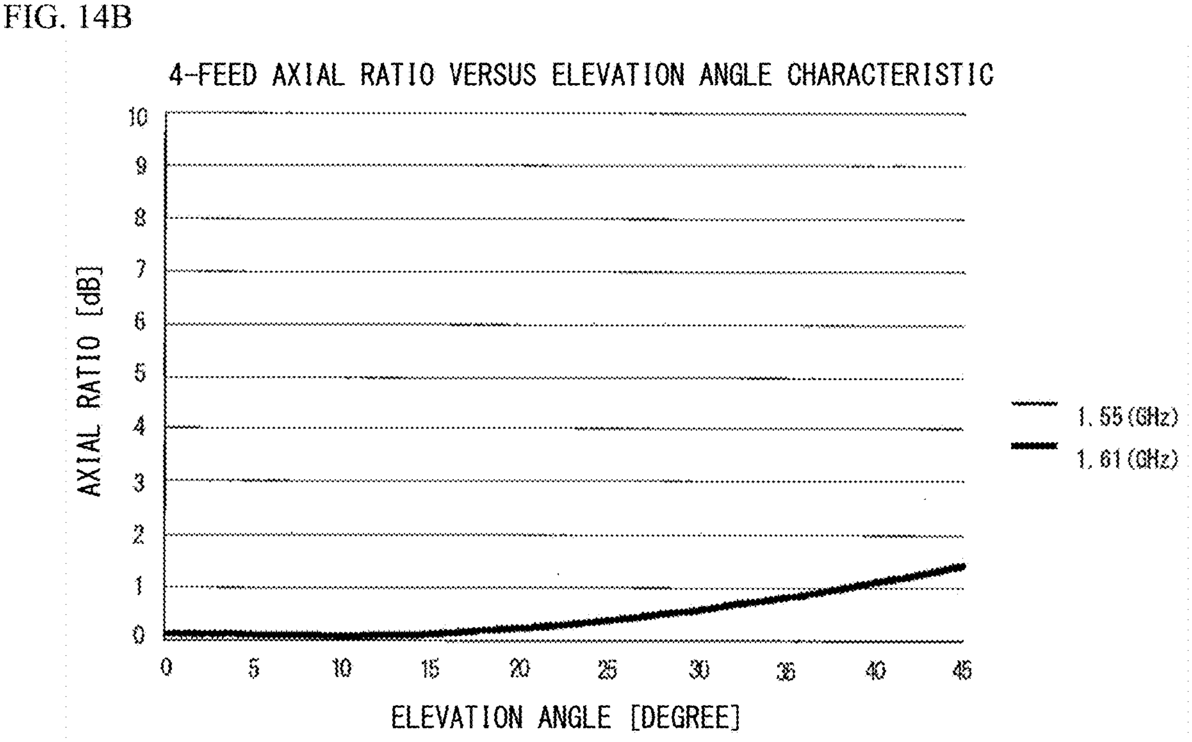
FIG. 14B is an axial ratio versus elevation angle characteristic diagram in the four-feed type.

FIG. 14A and FIG. 14B are axial ratio versus elevation angle characteristic diagrams in the two-feed type and in the four-feed type, respectively, vertical axes represent axial ratio (dB), and horizontal axes represent elevation angle (an angle from the zenith zero degree toward a horizontal plane). As for frequencies, 1.55 GHz and 1.61 GHz are selected. Those frequencies are selected taking into consideration the L1 band of the GNSS. In the two-feed type, at 1.61 GHz, the axial ratio (dB) is not improved at any elevation angle. At 1.55 GHz, the axial ratio becomes 1 dB or lower from a part around an elevation angle of 30 degrees but is maintained at 0.7 dB or higher around 45 degrees. On the other hand, in the four-feed type, the axial ratio is almost 0 dB to a part around an elevation angle of 15 degrees, and the axial ratio exceeds 1 dB near a part exceeding 40 degrees. In other words, it can be understood that the axial ratio is improved by the four-feed.

Figure 15A:
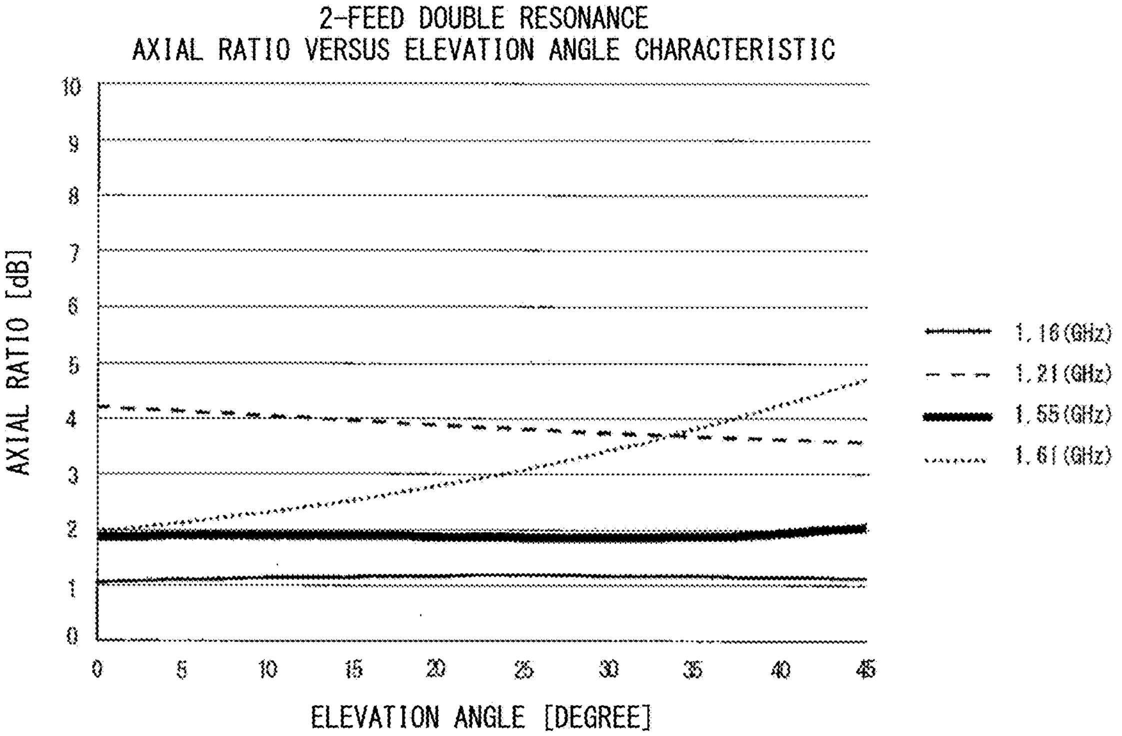
FIG. 15A is an axial ratio versus elevation angle characteristic diagram in the two-feed double resonance type.
Figure 15B:
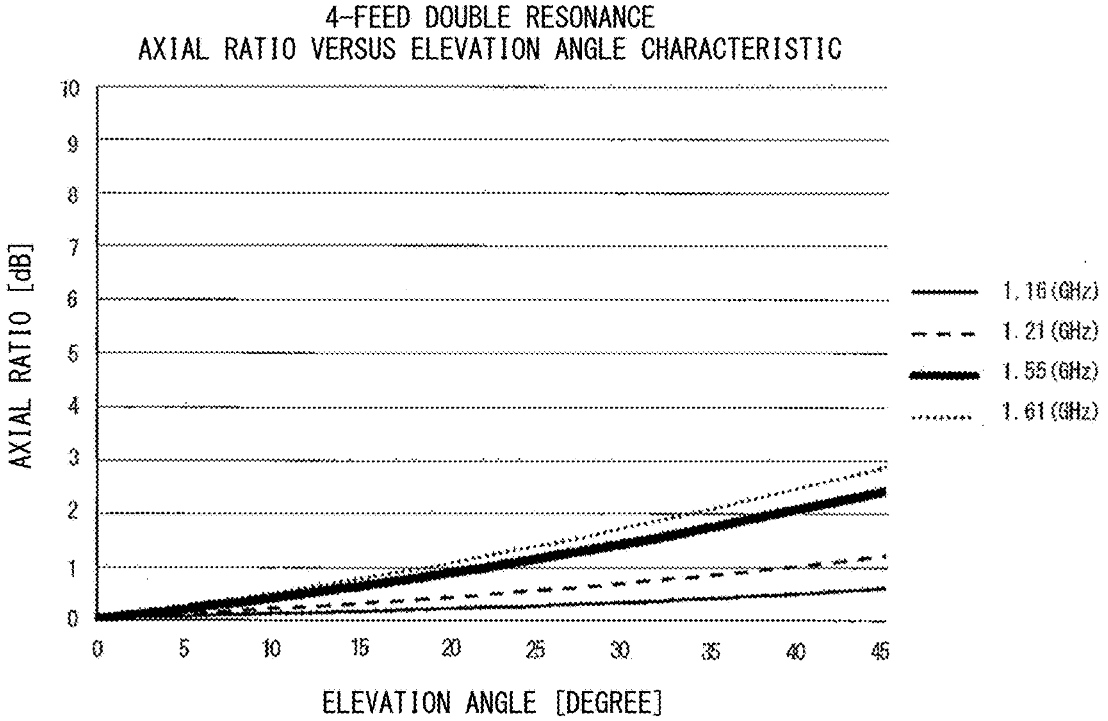
FIG. 15B is an axial ratio versus elevation angle characteristic diagram in the four-feed double resonance type.

FIG. 15A and FIG. 15B are axial ratio versus elevation angle characteristic diagrams in the two-feed double resonance type and in the four-feed double resonance type, respectively, and vertical axes and horizontal axes are the same as FIG. 14A and FIG. 14B. As for frequencies, in addition to 1.55 GHz and 1.61 GHz, 1.16 GHz and 1.21 GHz are selected. Those frequencies are selected taking into consideration the L1 band of the GNSS and the L2 band of the GNSS in addition to the L5 band of the GNSS.

In the two-feed double resonance type, the axial ratio does not become 1 dB or lower at any elevation angle, and in particular, at 1.21 GHz, the axial ratio exceeds 4 dB even at an elevation angle of 0 degree. Further, at 1.61 GHz, the axial ratio becomes approximately 2 dB at an elevation angle of 0 degree, and the axial ratio becomes higher as the elevation angle increases. Thus, in the two-feed double resonance type, in the L2 band of the GNSS and the L1 band of the GNSS, it becomes difficult to acquire accurate position information from the reception signal. On the other hand, in the four-feed double resonance type, in a case where the elevation angle is 0 degree, the axial ratio is near 0 dB at any frequency. In particular, at 1.16 GHz, the axial ratio is about 0.6 even when the elevation angle exceeds 45 degrees. It can be understood that the axial ratio is significantly improved.

Figure 16A:
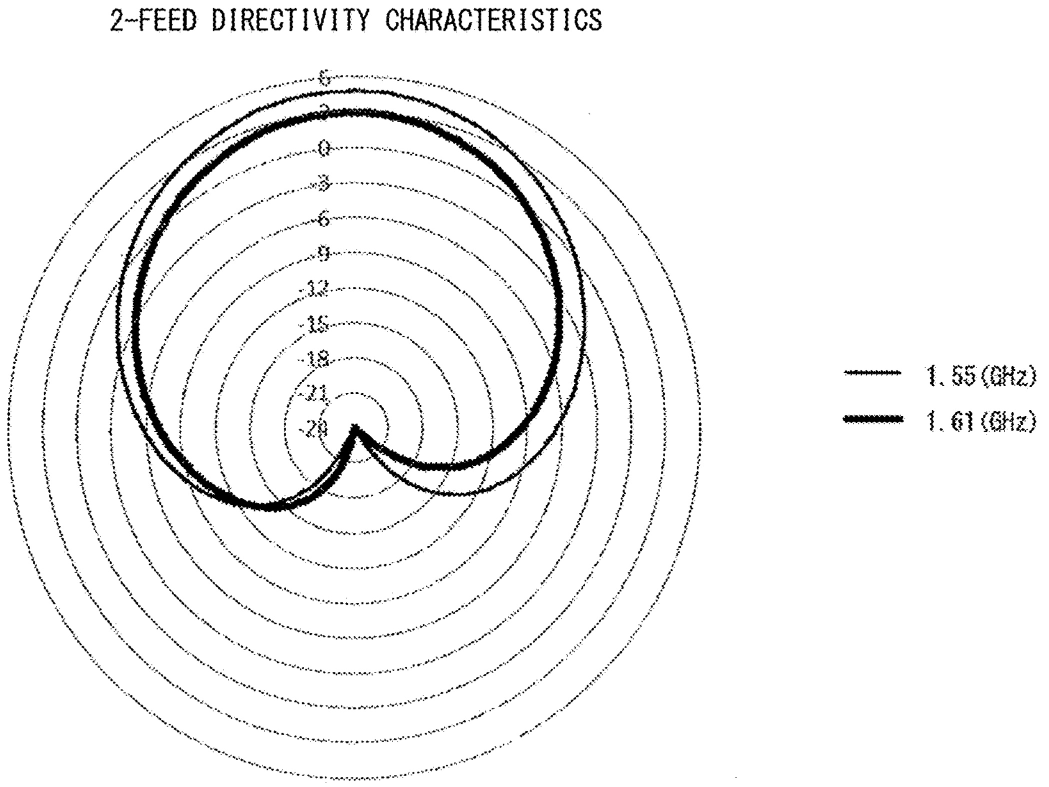
FIG. 16A is a directivity characteristic diagram in the two-feed type.
Figure 16B:
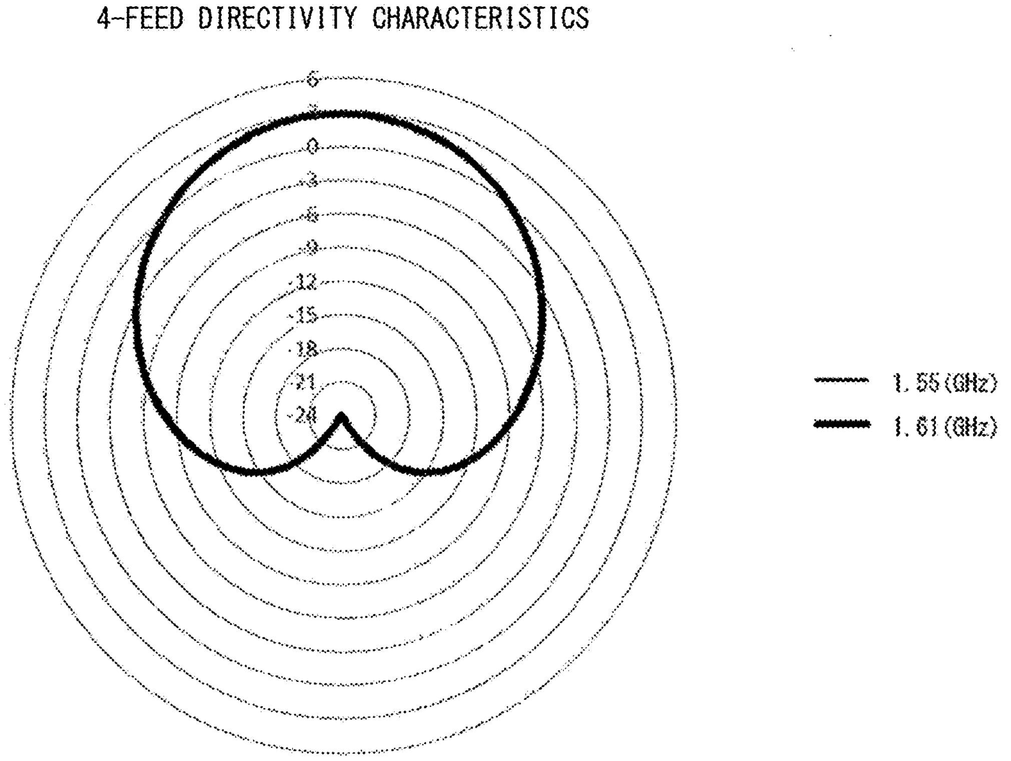
FIG. 16B is a directivity characteristic diagram in the four-feed type.

FIG. 16A and FIG. 16B are diagrams of directivity characteristics in a vertical plane with respect to right-handed circularly polarized waves in the two-feed type and in the four-feed type, respectively. In FIG. 16A and FIG. 16B, a direction, in which an upper side of the Z axis which is vertical to the ground conductor and passes through centers of the patch electrodes 323 and 423 is the zenith (0 degree), in other words, directly above the patch electrodes 323 and 423, and right-handed 90 degrees corresponds to the Y axis, and right-handed 270 degrees (left-handed 90 degrees) corresponds to the X axis. Concentric circles represent the gain (dBic). As for frequencies, 1.55 GHz and 1.61 GHz are selected.

It can be understood that in the two-feed type, the directivity characteristics are uneven depending on the frequencies but in the four-feed type, the directivity is directed in the zenith direction regardless of the frequencies.

Figure 17A:
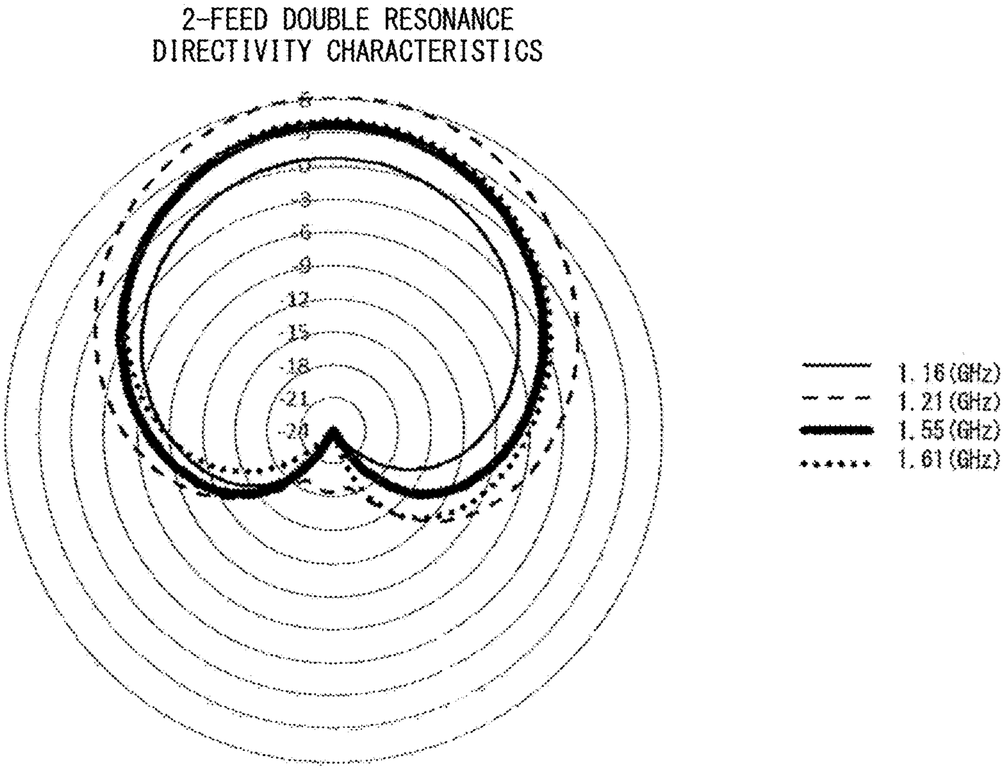
FIG. 17A is a directivity characteristic diagram in the two-feed double resonance type.
Figure 17B:
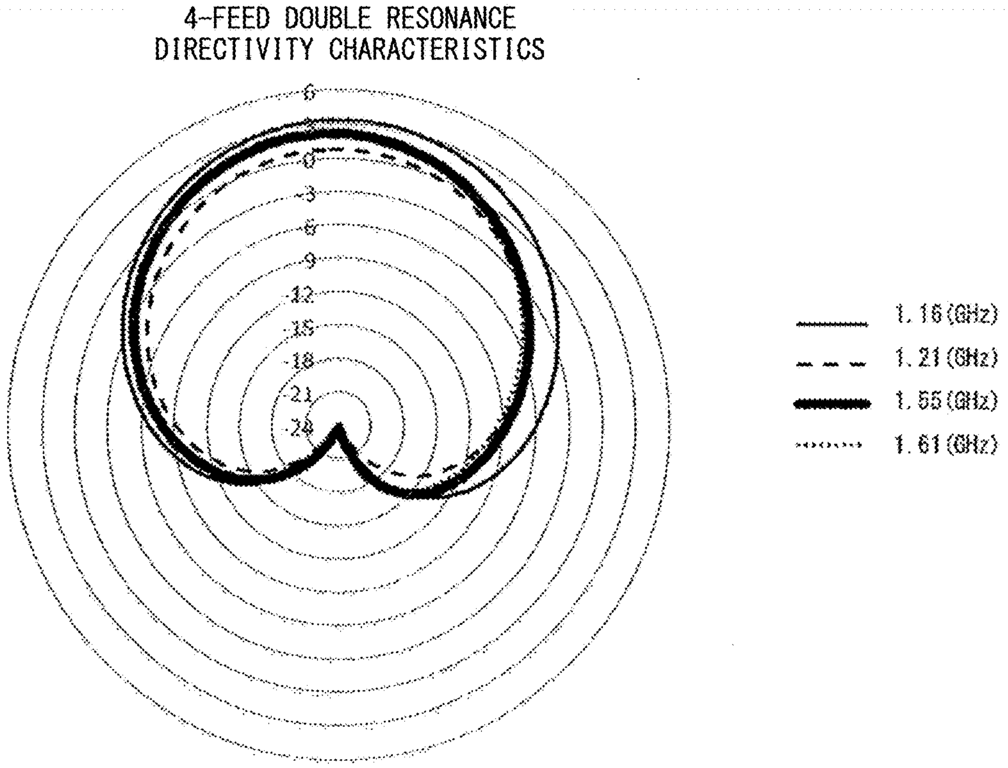
FIG. 17B is a directivity characteristic diagram in the four-feed double resonance type.

FIG. 17A and FIG. 17B are directivity characteristic diagrams in the two-feed double resonance type and in the four-feed double resonance type, respectively, and contents of graphs are the same as FIG. 16A and FIG. 16B. Frequencies are 1.55 GHz, 1.61 GHz, 1.16 GHz, and 1.21 GHz. It can be understood that unevenness of the directivity depending on the frequencies occurs the same in the two-feed double resonance type and the four-feed double resonance type but the degree of unevenness is lower in the four-feed double resonance type.

The above description indicates the characteristics in a case where the LNA 261 is not arranged in a rear stage of the feeding circuit 20*a*, but even in a case where the LNA 261 is arranged in the rear stage of the feeding circuit 20*a*, only the gain is changed by the LNA 261, and the characteristics themselves are not changed. In accordance with an arrangement position of the LNA 261, top loss of the antenna 1, that is, passing loss of power from the patch electrode 123 to an initial stage amplifier (the LNA 261 in this example) may be changed.

Figure 18A:
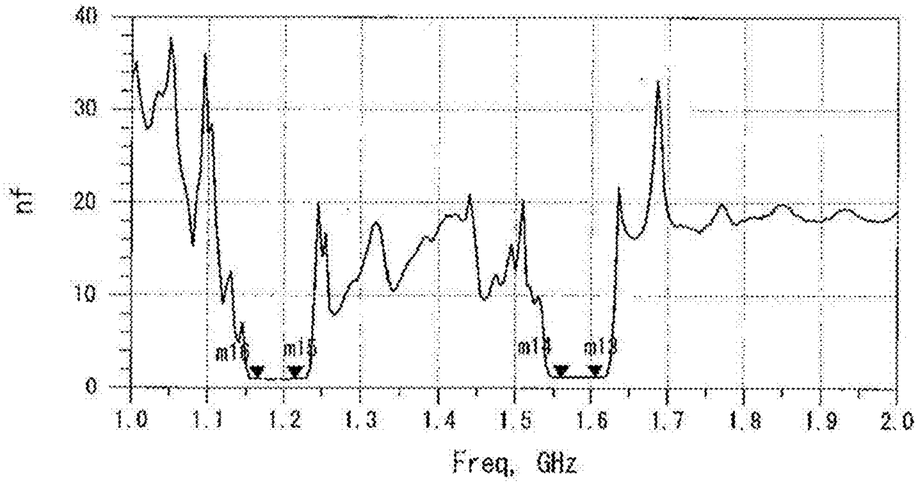
FIG. 18A is a graph representing a change in an NF characteristic based on difference in an insertion part of an LNA.
Figure 18B:
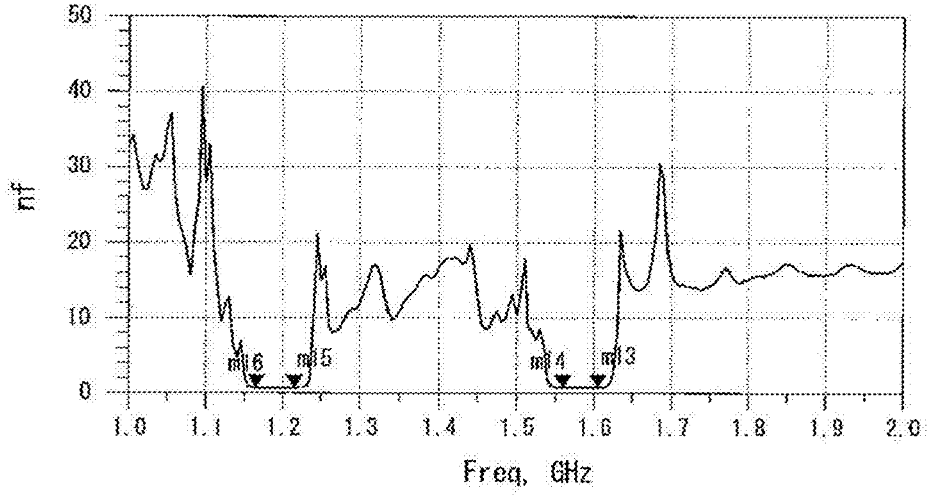
FIG. 18B is a graph representing the change in the NF characteristic based on difference in the insertion part of the LNA.
Figure 18C:
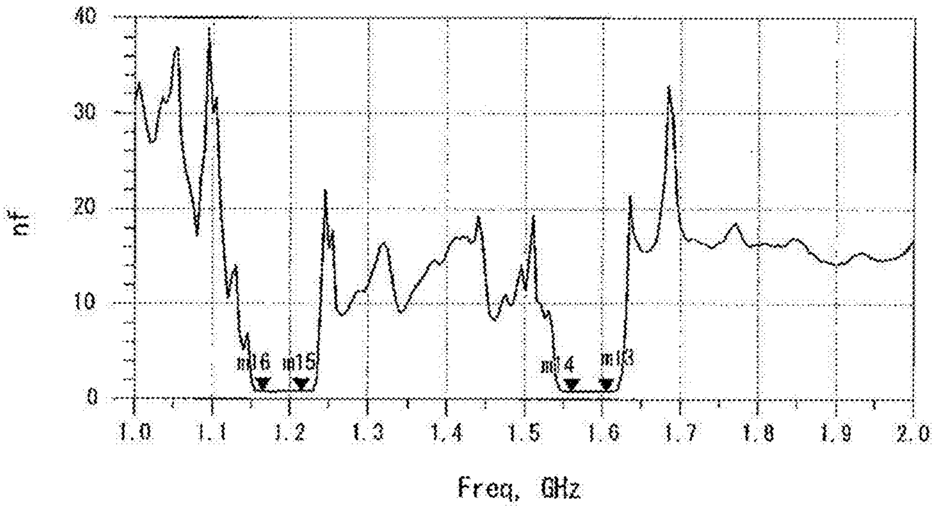
FIG. 18C is a graph representing the change in the NF characteristic based on difference in the insertion part of the LNA.

FIG. 18A to FIG. 18C are graphs for comparing characteristics of a noise factor throughout the GNSS frequency band. FIG. 18A illustrates a characteristic example in a case of arrangement of the present embodiment. An arrangement example in this case will be referred to as present example. FIG. 18B illustrates a characteristic example in a case where two LNAs 261 are arranged in a front stage of the combiners 231 and 232 in an initial stage. Such arrangement will be referred to as modification example 1. FIG. 18C illustrates a characteristic example in a case where the LNA 261 is arranged in a front stage of the combiner 251 in a second stage. Such an arrangement example will be referred to as modification example 2. In those graphs, vertical axes represent the noise factor (nf), and horizontal axes represent the GNSS frequency (GHz). As for measurement points, m13 indicates 1.615 GHz, m14 indicates 1.560 GHz, m15 indicates 1.215 GHz, and m16 indicates 1.165 GHz.

Referring to those diagrams, in the present example of FIG. 18A, the noise factors are 1.220 at the measurement point of m13, 1.170 at the measurement point of m14, 0.978 at the measurement point of m15, and 0.965 at the measurement point of m16. Meanwhile, in the modification example 1 of FIG. 18B, the noise factors are 0.843 at the measurement point of m13, 0.788 at the measurement point of m14, 0.737 at the measurement point of m15, and 0.747 at the measurement point of m16.

Further, in the modification example 2 of FIG. 18C, the noise factors are 0.866 at the measurement point of m13, 0.825 at the measurement point of m14, 0.820 at the measurement point of m15, and 0.832 at the measurement point of m16.

In other words, when it is assumed that the noise factors of the present example are set as 1 at the measurement points of m13 and m14 and set as 1.2 at the measurement points of m15 and m16, in the modification example 1, the noise factors are improved to 0.8 at measurement points of m13 and [m24] m12 and to 0.7 at the measurement points of m15 and m16. Further, in the modification example 2, the noise factors are improved to 0.9 at the measurement point of m13 and to 0.8 at measurement points of m14, m15, and [m26]] m16. In other words, it has been found that the LNAs 261 are arranged in positions as close as possible to the patch electrode 123, in other words, in the front stages of the phase shifters 221 to 224, 241, and 242 and the mixers 231, 232, and 251 and a total noise factor of the antenna 1 can thereby be made better.

Figure 19:
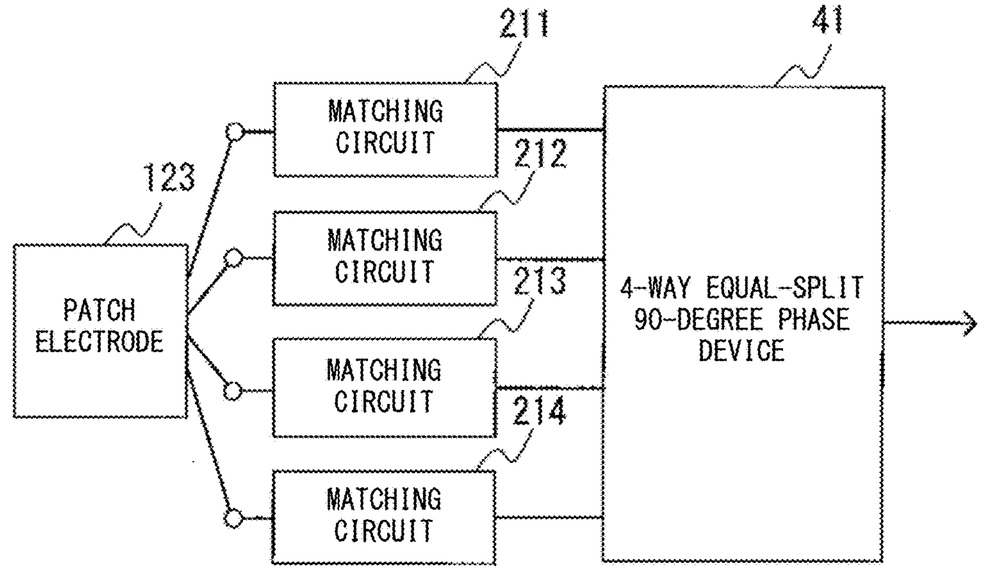
FIG. 19 is a block diagram illustrating a modification example of the feeding circuit.

The feeding circuit 20*a* may be practiced in various forms other than FIG. 4, FIG. 5, and FIG. 6. FIG. 19 illustrates an example of a case where one 4-way equal-split 90-degree phase device 41 is used in which functions of the phase shifters 221 to 224, 241, and 242 and the combiners 231, 232, and 251, which are illustrated in FIG. 6, are integrated together. The antenna 1 can be made smaller and lighter by using the 4-way equal-split 90-degree phase device 41.

Figure 20:
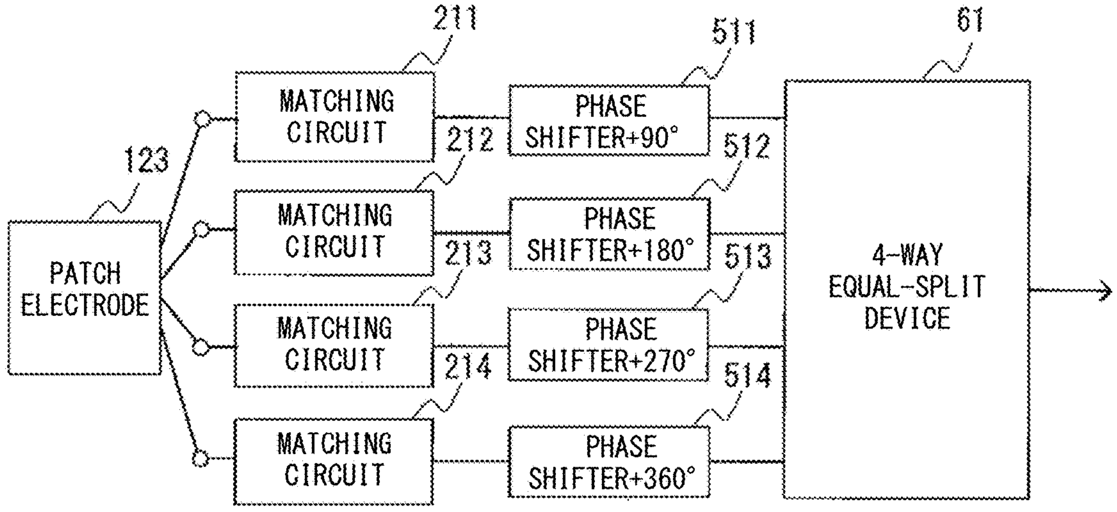
FIG. 20 is a block diagram illustrating another modification example of the feeding circuit.

FIG. 20 illustrates an example where a phase shifter 511 which performs a phase shift of +90 degrees for an input signal and outputs the input signal, a phase shifter 512 which performs a phase shift of +180 degrees for the input signal and outputs the input signal, a phase shifter 513 which performs a phase shift of +270 degrees for the input signal and outputs the input signal, and a phase shifter 514 which performs a phase shift of +360 degrees for the input signal and outputs the input signal are placed instead of the phase shifters 221 to 224 illustrated in FIG. 6 and a 4-way equal-split device 61 is placed instead of the combiners 231, 232, and 251 and the phase shifters 241 and 242. Because the combiners 231, 232, and 251 are not used, a smaller and simpler feeding circuit can be realized.

Figure 21:
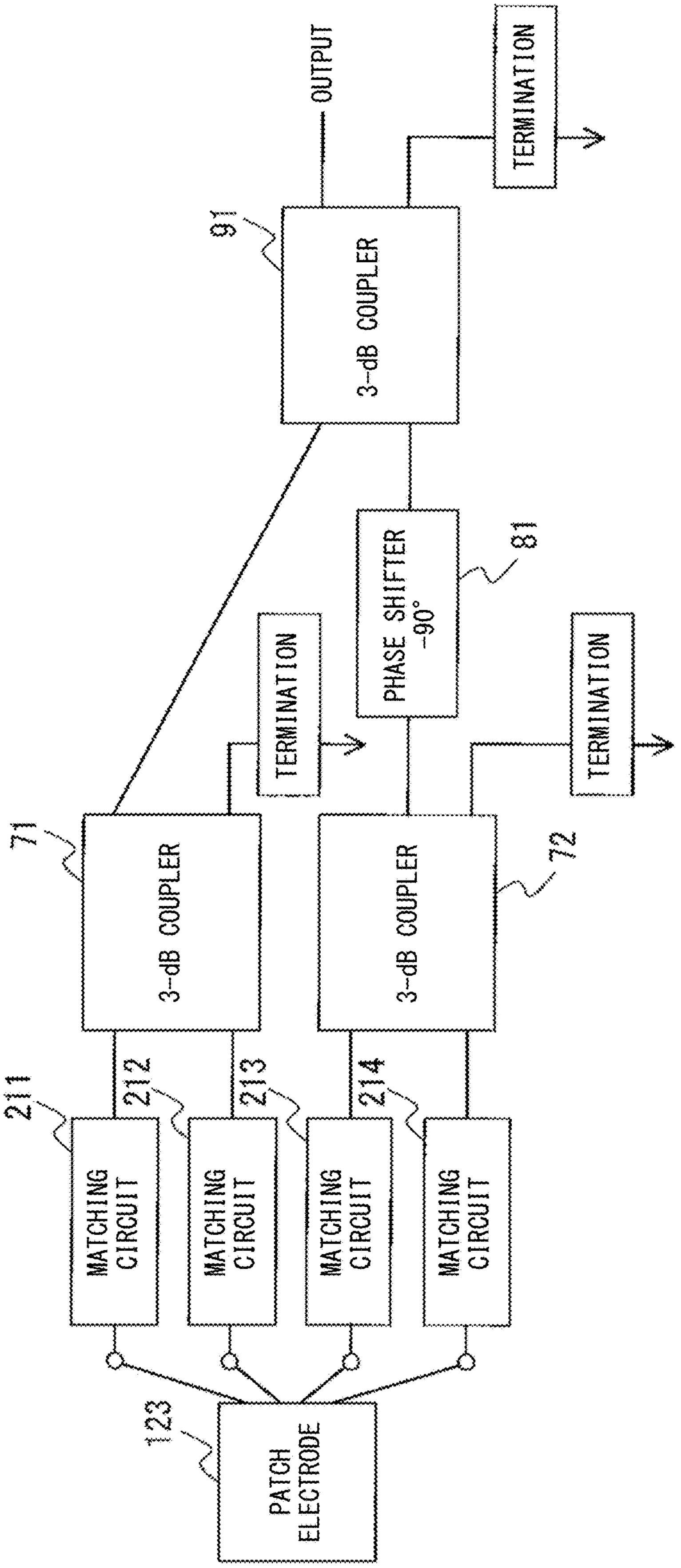
FIG. 21 is a block diagram illustrating another modification example of the feeding circuit.

FIG. 21 illustrates an example where two 3-dB couplers 71 and 72 are placed instead of the phase shifters 221 to 224 and the combiners 231 and 232 which are illustrated in FIG. 6 and one phase shifter 81 which performs a phase shift of −90 degrees for an input signal and a 3-dB coupler 91 are placed instead of the phase shifters 241 and 242 and the combiner 251. Each of the 3-dB couplers 71, 72, and 91 is terminated at 50 ohms. The 3-dB couplers 71, 72, and 91 may be combiners, but commercially available general-purpose couplers as discrete components may also be used. By using a feeding circuit in such configurations, an antenna can be made smaller and lighter than the antenna 1 having the feeding circuit 20*a* illustrated in FIG. 6.

The antenna 1 of the present embodiment is capable of being installed alone in a moving body such as a robot or a drone and is also usable for an antenna apparatus for a vehicle in which antenna portions for various frequency bands are installed in one casing, in recent years.

Figure 22:
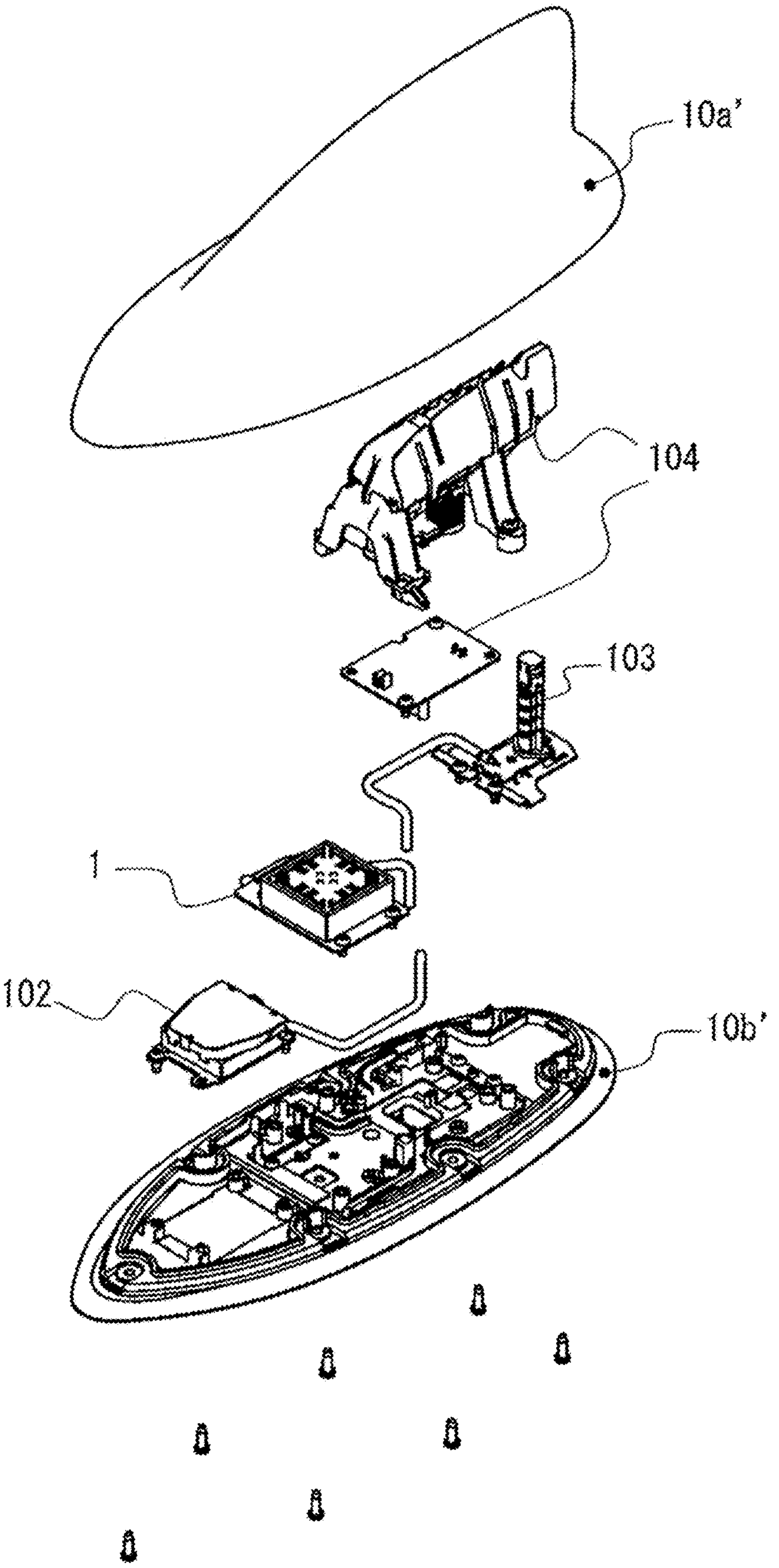
FIG. 22 is an exploded diagram of a composite antenna apparatus in which an antenna for another frequency band is installed in addition to an antenna for a satellite positioning system.

FIG. 22 is an exploded diagram of a composite antenna apparatus for a vehicle which is equipped with the antenna 1 of the present embodiment. The composite antenna apparatus is configured to accommodate the antenna 1, a planar antenna 102 for another frequency band, a pole antenna 103 for digital television broadcasting, and a solid antenna 104 for AM/FM broadcasting on an antenna base 10*b*' which is sealed by an antenna cover 10*a*' in an airtight and watertight manner.

Because the antenna 1 has directivity in the zenith direction and the axial ratio in the zenith direction is considerably improved compared to antennas in related art, even when the planar antennas 102, 103, and 104 for other frequency bands are arranged close to the antenna 1, the antenna 1 can accurately receive a signal for position information calculation at least in the GNSS frequency band.

Demonstration Experiment

A description will be made about a demonstration experiment for comparing position accuracy by using the four-feed double resonance antenna 1 (in which the receiver 271 is installed) in a configuration illustrated in FIG. 2 and FIG. 6 and a two-feed double resonance reference example antenna (in which the receiver 271 is installed) in a configuration illustrated in FIG. 8 and FIG. 9.

The demonstration experiment was performed in the following manner. First, a display device for displaying position information output by the receiver 271 of each of the antennas (the antenna 1 and the reference example antenna) was connected to the receiver 271 and was installed in a vehicle. The position information of the vehicle traveling on a road in a poor environment for receiving electric waves was calculated, and the calculated position information of the vehicle was displayed, together with a map, on the display device. Then, the accuracy of the position information of the vehicle with respect to the map was visually checked for the four-feed double resonance antenna 1 and the two-feed double resonance reference example antenna. The road on which the vehicle traveled is an ordinary road which is present directly below an elevated toll road, in other words, an ordinary road on which an elevated toll road is present in the zenith direction of each of the antennas.

Figure 23:
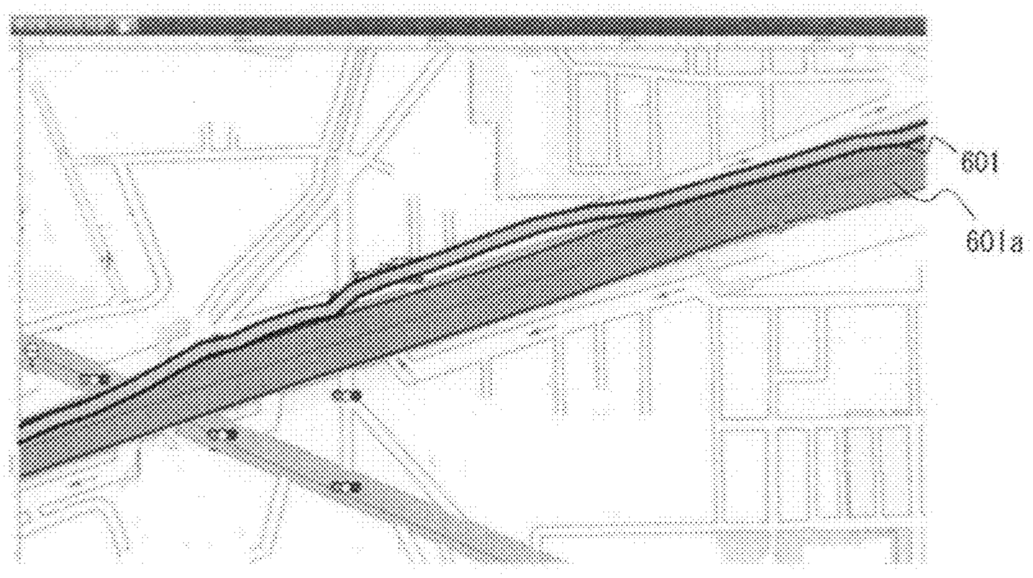
FIG. 23 is a diagram which visualizes a state of position information to be calculated when a vehicle in which a two-feed double resonance antenna is installed travels on an ordinary road in a first zone where an elevated road is present in a zenith direction.
Figure 24:
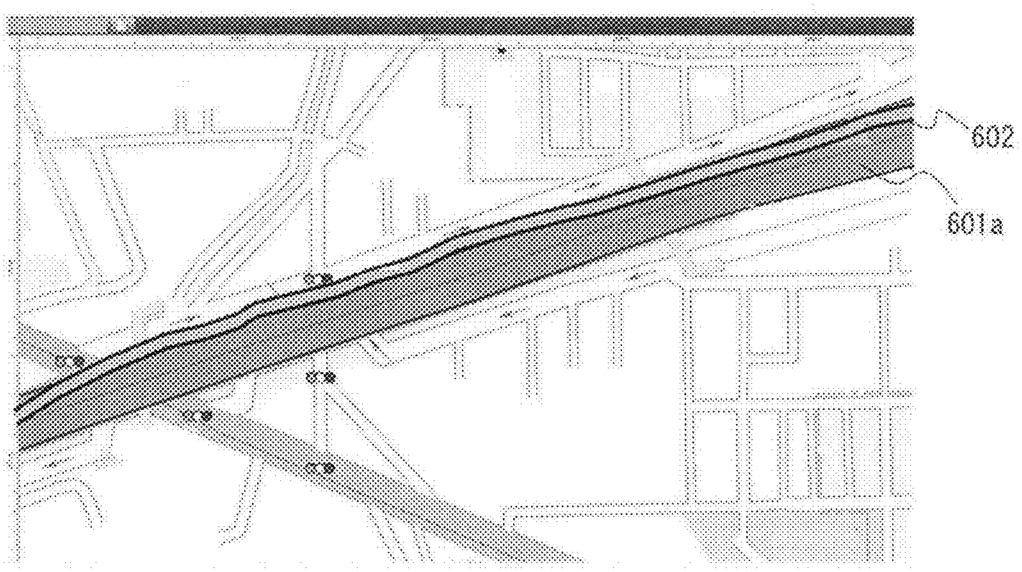
FIG. 24 is a diagram which visualizes a state of position information to be calculated when a vehicle in which a four-feed double resonance antenna is installed travels on an ordinary road in the first zone where an elevated road is present in the zenith direction.

FIG. 23 illustrates a screen which displays a traveling position (a traveling track formed by plural pieces of position information calculated in response to traveling of the vehicle) 601 of the vehicle by the reference example antenna in a time when the vehicle travels on an ordinary road in a first zone. It has been observed that the calculated traveling position 601 of the vehicle indicates a position which is largely off from the actual ordinary road to a left side on the map while being influenced by an elevated toll road 601*a*. Meanwhile, FIG. 24 illustrates a screen which displays a traveling position 602 by the antenna 1 in a time when the vehicle travels on the same ordinary road. It has been observed that the traveling position 602 of the vehicle which is detected by the antenna 1 indicates a correct position on the map regardless of the presence of the elevated toll road without being deviated from the actual ordinary road.

Figure 25:
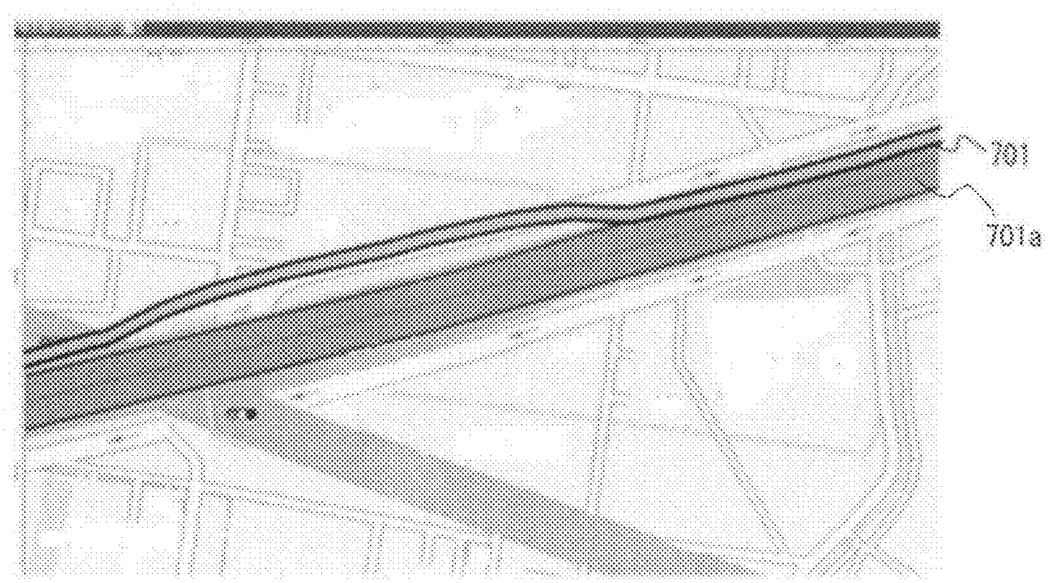
FIG. 25 is a diagram which visualizes a state of position information to be calculated when the vehicle in which the two-feed double resonance antenna is installed travels on an ordinary road in a second zone where an elevated road is present in the zenith direction.
Figure 26:
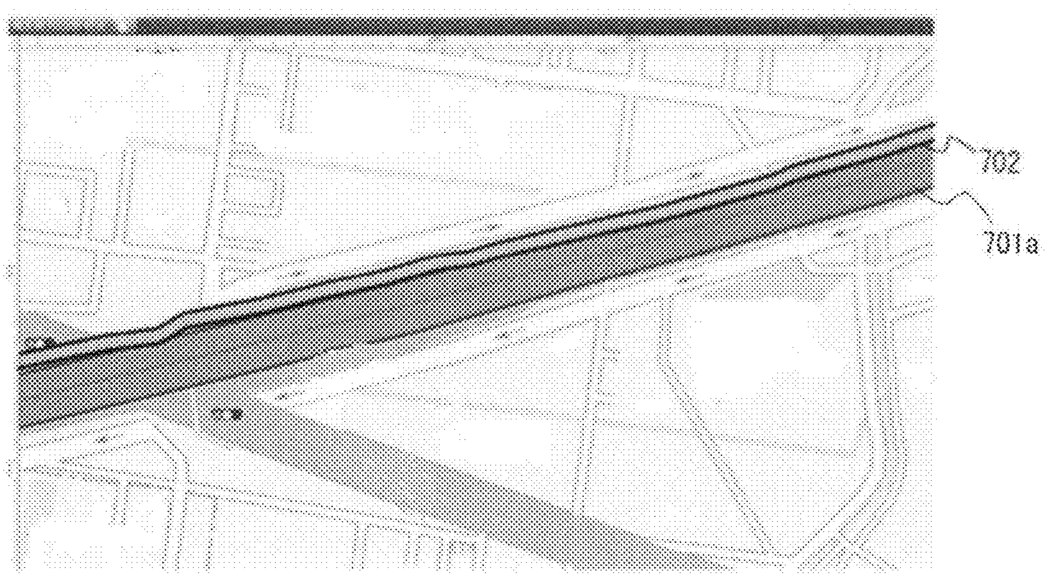
FIG. 26 is a diagram which visualizes a state of position information to be calculated when the vehicle in which the four-feed double resonance antenna is installed travels on an ordinary road in the second zone where an elevated road is present in the zenith direction.

FIG. 25 illustrates a screen which displays a traveling position 701 of the vehicle by the reference example antenna in a time when the vehicle travels on an ordinary road in a second zone different from the first zone. It has been observed that the calculated traveling position 701 of the vehicle indicates a position which is largely off from the actual ordinary road to a left side on the map while being influenced by an elevated toll road 701*a*. Meanwhile, FIG. 26 illustrates a screen which displays a traveling position 702 by the antenna 1 in a time when the vehicle travels on the same ordinary road. It has been observed that the traveling position 702 of the vehicle which is calculated by the antenna 1 indicates a correct position on the map without being deviated from the actual ordinary road.

As described above, it has been demonstrated that the antenna 1 of the present embodiment can calculate the position information with higher accuracy than a first reference example antenna with two-feed double resonance even when the vehicle travels on the road, on which an obstacle is present in the zenith direction, in either one of the first zone and the second zone.

Main Points of the Present Embodiment

From the above description of the present embodiment, for example, the following configurations and working effects by those are derived.

(1) An antenna including: a dielectric; and a patch electrode and a circuit substrate which are mounted on the dielectric, in which the patch electrode has four feeding terminals, and on the circuit substrate, substrate-side feeding terminals which are electrically connected respectively with the four feeding terminals in a one-to-one manner, a phase circuit which performs a phase shift for signals output from the substrate-side feeding terminals, a combining circuit which combines signals for which the phase shift is performed by the phase circuit, and an amplifier circuit which amplifies signals combined by the combiner are mounted.

In the antenna in this configuration, the antenna characteristics in the zenith direction are considerably improved compared to an antenna which has the patch electrode illustrated in FIG. 7A and FIG. 7B or the patch electrode illustrated in FIG. 8, for example. Thus, as it is clear from the above demonstration experiment, position accuracy of a moving body in which the antenna is installed is considerably improved.

(2) The antenna, in which the circuit substrate is mounted on a surface side opposite to a surface side on which the patch electrode of the dielectric is mounted and each of the four feeding terminals is opposed to a corresponding electrically connected section in the substrate-side feeding terminal.

In the antenna in this configuration, because each of the four feeding terminals is made electrically connected with the corresponding electrically connected section in the substrate-side feeding terminal in a shortest distance defined by a thickness of the dielectric, the antenna is less likely to be subject to external influences.

(3) The antenna, in which four slots are formed in the patch electrode.

The antenna in this configuration performs an antenna action for transmitting and/or receiving electric waves at frequencies which satisfy resonance conditions based on the size of the patch electrode and on permittivity of the dielectric and a slot action for transmitting and/or receiving electric waves at frequencies which satisfy resonance conditions even in consideration of electrical lengths of the slots. In other words, a "double resonance" action becomes possible.

(4) The antenna, in which feeding phases of the four feeding terminals are respectively different by 90 degrees from feeding phases of the other neighboring feeding terminals.

By the antenna in this configuration, an improvement in the axial ratio of a circularly polarized wave becomes possible.

(5) The antenna, in which the phase circuit includes a first phase circuit and a second phase circuit, the combining circuit includes a first combining circuit and a second combining circuit, the first phase circuit is arranged in a rear stage of the substrate-side feeding terminal, the second phase circuit is arranged in a rear stage of the first phase circuit, the first combining circuit is arranged in a rear stage of the first phase circuit and in a front stage of the second phase circuit, the second combining circuit is arranged in a rear stage of the second phase circuit, and the amplifier circuit is arranged in a rear stage of the second combining circuit.

The first phase circuit has two phase shifters which perform a phase shift of 45 degrees in a positive direction for input signals and two phase shifters which perform a phase shift of 45 degrees in a negative direction for input signals, for example.

Further, the second phase circuit has a phase shifter which performs a phase shift of 90 degrees in the positive direction for an input signal and a phase shifter which performs a phase shift of 90 degrees in the negative direction for an input signal, for example.

In the antenna in this configuration, because phase shifts of predetermined amounts are respectively performed for plural signals which are received in plural positions and are dividedly input and the plural signals are thereafter combined, circularly polarized waves propagated from plural directions can highly accurately be received.

In one embodiment, the combining circuit is a Wilkinson divider. In such a configuration, a main portion of a circuit can be realized with a conductor pattern group which is printed on the substrate, and mass production of the antenna thereby becomes easy.

(6) The antenna, in which the amplifier circuit is mounted in a front stage of the combining circuit.

Further, in the antenna, for example, the phase circuit includes a first phase circuit and a second phase circuit, the combining circuit includes a first combining circuit and a second combining circuit, the first phase circuit is arranged in a rear stage of the substrate-side feeding terminal, the second phase circuit is arranged in a rear stage of the first phase circuit, the first combining circuit is arranged in a rear stage of the first phase circuit and in a front stage of the second phase circuit, the second combining circuit is arranged in a rear stage of the second phase circuit, and the amplifier circuit is arranged in a front stage of the first combining circuit or the second combining circuit.

In the antenna in this configuration, the reception signal is amplified in the front stage of the combining circuit, passing loss can thereby be reduced, and a signal which is excellent in a signal-to-noise ratio can be output.

(7) An information processing apparatus being installed in a moving body, the information processing apparatus including: any one of the above antennas; and a position information processing circuit which calculates position information of the antenna based on a signal output from the antenna. The information processing apparatus in this configuration can highly accurately calculate position information of an autonomously driven vehicle, for example.

(8) In a composite antenna apparatus including: a first antenna for a satellite positioning system, the first antenna having a patch electrode which has four feeding terminals and a circuit substrate which performs signal processing for a reception signal from the patch electrode; a second antenna which receives a signal in a frequency band different from the first antenna; an antenna base on which the first antenna and the second antenna are situated; and an antenna casing which accommodates, together with the antenna base, the first antenna and the second antenna, the first antenna adapted to multiple frequencies are accommodated, together with the other antenna (second antenna), in the same accommodation space, and size reduction of the device and space saving thereby become possible.

(9) In an antenna including: a dielectric; a patch electrode which is mounted on the dielectric; and four feeding terminals which are mounted on the patch electrode, in which feeding phases of the four feeding terminals are respectively different by 90 degrees from feeding phases of the other neighboring feeding terminals and each of the four feeding terminals is directly electrically connected with a substrate-side feeding terminal that is mounted on a side of a circuit substrate which performs signal processing for a reception signal from the patch electrode, an improvement in the axial ratio of a circularly polarized wave becomes possible.

(10) A configuration may be possible in which each of the four slots in the patch electrode is a slot which has a meandering portion and has the same shape. In such a configuration, because a frequency which satisfies the resonance conditions can be adjusted by the slot, flexibility of antenna design can be increased.

Further, as illustrated in FIG. 2, in the patch electrode 123, the four electrode-side feeding terminals p11, p12, p13, and p14 are formed at the positions in point symmetry with respect to the center point of the patch electrode 123. On the feeding unit 20, four feeding-side feeding terminals p21, p22, p23, and p24 are mounted. In addition, based on a configuration with the matching circuits 211, 212, 213, and 214, the phase shifters 221, 222, 223, and 224, mixers 231, and 232 the phase shifters 241 and 242, and the mixer 251, the antenna can be configured as described in the following, for example.

(11) An antenna including: a dielectric; and a patch electrode and a circuit substrate which are mounted on the dielectric, in which in the patch electrode, four feeding terminals are formed in point symmetry with respect to a center point of the patch electrode, and on the circuit substrate, four substrate-side feeding terminals which are electrically continuous respectively with the four feeding terminals in a one-to-one manner, four first phase circuits each of which performs a phase shift of the same amount in a shift direction opposite to neighboring signals for a signal output from the closest substrate-side feeding terminal among the four substrate-side feeding terminals, two mixing circuits each of which mixes signals output from the two neighboring first phase circuits among the four first phase circuits, two second phase circuits each of which performs a phase shift of the same amount in a shift direction opposite to a neighboring signal for a signal output from one first mixing circuit of the two first mixing circuits, and a second mixing circuit which mixes output signals of the two second phase circuits are mounted.

In the antenna in such a configuration, for four signals which are received by the patch electrode of four-point feeding and are input to the circuit substrate through the substrate-side feeding terminals, the corresponding first phase circuits perform phase shifts of the same amount in shift directions opposite to the respective neighboring signals, and thereafter, each of the first combining circuits combines two signals. Then, for each of two signals resulting from combining, the second phase circuit performs a phase shift of the same amount in a shift direction opposite to the neighboring signal, and thereafter, the two signals are combined into one signal by the second combining circuit.

In a case where the positions of the four feeding terminals in the patch electrode are positions resulting from division of 360 degrees into four equal parts with the center point being an origin, a phase difference of 90 degrees (90 degrees, 180 degrees, 270 degrees, and 360 degrees (0 degree)) occurs between the two neighboring feeding terminals, and the phase differences themselves are exhibited as phase differences of four signals output from the feeding terminals. On the side of the circuit substrate which is electrically connected with each feeding terminal of the patch electrode, it is necessary to combine the four signals into one signal by compensating the phase differences among the four signals.

One of measures for compensating phase differences among signals is to combine the signals by performing phase shifts for the other signals such that the phases are matched with the phase of any one of the signals. However, when a phase shift is performed for a signal, as the phase amount of a shift becomes larger, passing loss of the signal (passing loss of power) becomes larger.

For example, in a case where the phase shift amount of one of two signals as targets is set to 0 degrees, the phase shift amount of the other signal is set to 90 degrees, and those signals are combined, passing loss does not occur to the signal with the phase shift amount of 0, and attenuation of an amplitude is thus small. However, as for the signal with the phase shift amount of 90 degrees, attenuation of the amplitude becomes huge due to an influence of passing loss. Thus, an amplitude difference between the two signals becomes extremely large, and undesirable influences might occur to antenna characteristics in a case where those are combined, particularly, gain and axial ratio.

In the antenna in the above configuration, the phase shift of the same amount (45 degrees or 90 degrees in the above example) in the shift direction opposite to the neighboring signal (+45 degrees, −45 degrees and +90 degrees, −90 degrees in FIG. 6) is performed such that passing loss of the signals in a case where the phase shifts are performed in the four first phase circuits and the two second phase circuits in the rear stage has an equivalent magnitude in each line, and passing loss due to the phase shift thereby becomes equivalent in each line.

Accordingly, the amplitude of each of the signals resulting from the phase shift becomes almost equivalent regardless of a reception frequency, and undesirable influences on the gain and axial ratio can be reduced. In other words, it becomes possible to widen a band, to reduce unevenness of directivity directed in the zenith direction, and to enlarge an elevation angle range in which the axial ratio is good.

REFERENCE SIGNS LIST

1 antenna
12 GNSS substrate assembly
20 feeding unit
**20*a*** feeding circuit
121 circuit substrate
122 dielectric
123, 323, 423, 523 patch electrode
p11, p12, p13, p14 electrode-side feeding terminal
p21, p22, p23, p24 substrate-side feeding terminal
81, 221, 222, 223, 224, 241, 242, 321, 322, 511, 512, 513, 514 phase shifter
231, 232, 251, 331 combiner
261 LNA
271 receiver

The invention claimed is:

1. An antenna comprising:
a dielectric; and
a patch electrode and a circuit substrate which are mounted on the dielectric,
wherein the patch electrode has four feeding terminals, and
wherein substrate-side feeding terminals which are electrically connected respectively with the four feeding terminals in a one-to-one manner, a phase circuit which performs a phase shift for signals output from the substrate-side feeding terminals, a combining circuit which combines signals for which the phase shift is performed by the phase circuit, and an amplifier circuit which amplifies signals combined by the combining circuit are mounted on the circuit substrate.

2. The antenna according to claim 1,
wherein the circuit substrate is mounted on a surface side opposite to a surface side on which the patch electrode of the dielectric is mounted, and
wherein each of the four feeding terminals is opposed to a corresponding electrically connected section in a corresponding one of the substrate-side feeding terminals.

3. The antenna according to claim 1, wherein four slots are formed in the patch electrode.

4. The antenna according to claim 1, wherein feeding phases of the four feeding terminals are respectively different by 90 degrees from feeding phases of the other neighboring feeding terminals.

5. The antenna according to claim 1, wherein the phase circuit has a first phase circuit which performs a phase shift in a shift direction opposite to a neighboring signal for a signal output from the closest substrate-side feeding terminal.

6. The antenna according to claim 5, wherein the combining circuit has a first combining circuit that combines the neighboring signal, for which the phase shift is performed by the first phase circuit, with a signal, for which the phase shift in the shift direction opposite to the neighboring signal is performed by the first phase circuit.

7. The antenna according to claim 5, wherein, in the first phase circuit, an amount of the phase shift in the opposite shift direction is the same as a phase shift amount for the neighboring signal.

8. The antenna according to claim 1, wherein:

the phase circuit includes a first phase circuit and a second phase circuit;

the combining circuit includes a first combining circuit and a second combining circuit;

the first phase circuit is arranged in a rear stage of a corresponding one of the substrate-side feeding terminals;

the second phase circuit is arranged in a rear stage of the first phase circuit;

the first combining circuit is arranged in a rear stage of the first phase circuit and in a front stage of the second phase circuit;

the second combining circuit is arranged in a rear stage of the second phase circuit; and the amplifier circuit is arranged in a rear stage of the second combining circuit.

9. The antenna according to claim 8, wherein the first phase circuit has two phase shifters which perform a phase shift of 45 degrees in a positive direction for input signals and two phase shifters which perform a phase shift of 45 degrees in a negative direction for input signals.

10. The antenna according to claim 8, wherein the second phase circuit has a phase shifter which performs a phase shift of 90 degrees in a positive direction for an input signal and a phase shifter which performs a phase shift of 90 degrees in a negative direction for an input signal.

11. The antenna according to claim 1, wherein the combining circuit is a Wilkinson divider.

12. The antenna according to claim 1, wherein the amplifier circuit is arranged in a rear stage of the combining circuit.

13. The antenna according to claim 1, wherein the amplifier circuit is arranged in a front stage of the combining circuit.

14. The antenna according to claim 1, wherein:

the phase circuit includes a first phase circuit and a second phase circuit;

the combining circuit includes a first combining circuit and a second combining circuit;

the first phase circuit is arranged in a rear stage of the substrate-side feeding terminal;

the second phase circuit is arranged in a rear stage of the first phase circuit;

the first combining circuit is arranged in a rear stage of the first phase circuit and in a front stage of the second phase circuit;

the second combining circuit is arranged in a rear stage of the second phase circuit; and the amplifier circuit is arranged in a front stage of the first combining circuit or the second combining circuit.

15. An information processing apparatus being installed in a moving body, the information processing apparatus comprising:

an antenna comprising:

a dielectric; and a patch electrode and a circuit substrate which are mounted on the dielectric, wherein the patch electrode has four feeding terminals, and wherein substrate-side feeding terminals which are electrically connected respectively with the four feeding terminals in a one-to-one manner, a phase circuit which performs a phase shift for signals output from the substrate-side feeding terminals, a combining circuit which combines signals for which the phase shift is performed by the phase circuit, and an amplifier circuit which amplifies signals combined by the combining circuit are mounted on the circuit substrate; and a position information processing circuit which calculates position information of the moving body based on a signal output from the antenna.

16. An antenna comprising:

a dielectric;

a patch electrode which is mounted on the dielectric; and four feeding terminals which are mounted on the patch electrode, wherein feeding phases of the four feeding terminals are respectively different by 90 degrees from feeding phases of the other neighboring feeding terminals, and each of the four feeding terminals is made electrically connected with a substrate-side feeding terminal that is mounted on a circuit substrate which performs signal processing for a reception signal from the patch electrode, wherein, on the patch electrode, four slots are mounted in positions in line symmetry with respect to a symmetry axis, which passes through a center point of the patch electrode, and in point symmetry with respect to the center point.

* * * * *